(12) United States Patent
Ruhlen et al.

(10) Patent No.: US 9,319,469 B2
(45) Date of Patent: Apr. 19, 2016

(54) HOST AGNOSTIC INTEGRATION AND INTEROPERATION SYSTEM

(75) Inventors: Matthew James Ruhlen, Redmond, WA (US); Kenneth John Yuhas, Jr., Seattle, WA (US); Mark T. Fields, Redmond, WA (US); Martin Abadi, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 13/329,964

(22) Filed: Dec. 19, 2011

(65) Prior Publication Data
US 2013/0080785 A1 Mar. 28, 2013

Related U.S. Application Data

(60) Provisional application No. 61/539,975, filed on Sep. 27, 2011.

(51) Int. Cl.
*H04L 9/32* (2006.01)
*G06F 15/16* (2006.01)
(Continued)

(52) U.S. Cl.
CPC .......... *H04L 67/16* (2013.01); *H04L 67/1002* (2013.01); *H04L 63/0807* (2013.01); *H04L 63/105* (2013.01)

(58) Field of Classification Search
CPC ..... H04L 9/3263; H04L 67/00; H04L 9/3226; H04L 9/3247; H04L 63/0442; H04L 9/3213; H04L 63/12; H04L 63/08; H04L 63/105; H04L 63/126; H04L 67/02; H04L 67/06; H04L 67/16; H04L 2209/88; H04L 12/58; H04L 63/0838; H04L 63/062; H04L 63/10; H04L 9/3297; H04L 63/0823; H04L 63/102; G06F 17/3012; G06F 11/0709; G06F 11/1443; G06F 11/0772; G06F 21/602; G06F 21/645; G06F 21/6254; G06F 21/6227; G06F 21/10; G06F 21/31; G06F 21/33; G06F 21/335; G06F 2221/2119; G06Q 30/0269

USPC .................. 726/26, 27, 10, 9; 705/50, 64, 74; 709/223, 224, 225, 229; 713/176
See application file for complete search history.

(56) References Cited

U.S. PATENT DOCUMENTS 5,875,296 A 2/1999 Shi et al.
6,708,215 B1 3/2004 Hingorani et al.
(Continued)

FOREIGN PATENT DOCUMENTS

CN 1225479 A 8/1999
CN 1853167 A 6/2011
(Continued)

OTHER PUBLICATIONS

Goh et al. (SiRiUS: Securing Remote Untrusted Storage) in proceedings of the Internet Society (ISOC) Network and Distributed Systems Security (NDSS) Symposium 2003, pp. 131-145.*
(Continued)

*Primary Examiner* — Tae Kim
*Assistant Examiner* — Shu Chun Gao
(74) *Attorney, Agent, or Firm* — Danielle Johnston Holmes; Tom Wong; Micky Minhas

(57) ABSTRACT

A host agnostic integration and interoperation system. The host agnostic integration and interoperation system includes an open platform interface and the associated conventions that define the roles of and direct operations between a host and a service application running on an external application server and allow the host to discover and integrate the functionality provided by the service application. The open platform interface employs a limited number of easily implemented semantic methods allowing a host to expose and integrate the ability to view, edit, or otherwise manipulate a document using the host supported functionality of the service application from a standard user agent. The host agnostic integration and interoperation system handles user authentication at the host using an access token and establishes a trust relationship between the host and the external application server using a lightweight but secure proof key system.

20 Claims, 10 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 6,766,298 | B1 | 7/2004 | Dodrill et al. |
| 6,931,429 | B2 | 8/2005 | Gouge et al. |
| 6,988,241 | B1 | 1/2006 | Guttman et al. |
| 7,120,590 | B1 | 10/2006 | Eisen et al. |
| 7,127,670 | B2 | 10/2006 | Bendik |
| 7,340,714 | B2 | 3/2008 | Upton |
| 7,376,650 | B1 | 5/2008 | Ruhlen |
| 7,401,131 | B2 | 7/2008 | Robertson et al. |
| 7,475,125 | B2 | 1/2009 | Brockway et al. |
| 7,603,450 | B2 | 10/2009 | Lutz |
| 7,606,814 | B2 | 10/2009 | Deily et al. |
| 7,644,414 | B2 | 1/2010 | Smith et al. |
| 7,650,432 | B2 | 1/2010 | Bosworth et al. |
| 7,716,357 | B2 | 5/2010 | Milligan et al. |
| 7,720,906 | B2 | 5/2010 | Brockway et al. |
| 8,195,792 | B2 | 6/2012 | Ruhlen et al. |
| 2001/0032220 | A1 | 10/2001 | Ven Hoff |
| 2003/0014521 | A1 | 1/2003 | Elson et al. |
| 2003/0084045 | A1 | 5/2003 | Anderson et al. |
| 2003/0204579 | A1 | 10/2003 | Lutz |
| 2003/0208563 | A1 | 11/2003 | Acree et al. |
| 2004/0006492 | A1 | 1/2004 | Watanabe |
| 2004/0143669 | A1 | 7/2004 | Zhao et al. |
| 2004/0243923 | A1 | 12/2004 | Nakamura |
| 2005/0021771 | A1 | 1/2005 | Kaehn et al. |
| 2005/0049924 | A1 | 3/2005 | DeBettencourt et al. |
| 2005/0125529 | A1 | 6/2005 | Brockway et al. |
| 2005/0268215 | A1 | 12/2005 | Battagin et al. |
| 2007/0038610 | A1 | 2/2007 | Omoigui |
| 2007/0061698 | A1 | 3/2007 | Megiddo et al. |
| 2007/0100967 | A1 | 5/2007 | Smith et al. |
| 2008/0209037 | A1 | 8/2008 | Zernik et al. |
| 2008/0244721 | A1* | 10/2008 | Barrus et al. ............... 726/9 |
| 2009/0007067 | A1 | 1/2009 | Hepper et al. |
| 2009/0064148 | A1 | 3/2009 | Jaeck et al. |
| 2009/0150417 | A1 | 6/2009 | Ghods |
| 2009/0157987 | A1 | 6/2009 | Barley et al. |
| 2010/0185747 | A1* | 7/2010 | Ruhlen et al. ............ 709/219 |
| 2010/0211781 | A1 | 8/2010 | Auradkar et al. |
| 2011/0083167 | A1 | 4/2011 | Carpenter et al. |
| 2011/0093941 | A1 | 4/2011 | Liu et al. |
| 2011/0138478 | A1 | 6/2011 | Kaarela et al. |
| 2011/0151840 | A1 | 6/2011 | Gong et al. |
| 2013/0080507 | A1 | 3/2013 | Ruhlen et al. |

FOREIGN PATENT DOCUMENTS

| | | |
|---|---|---|
| CN | 102118249 A | 7/2011 |
| KR | 10-2009-0038105 | 4/2009 |

OTHER PUBLICATIONS

Security Token Service Endpoint, Visual Studio 2010, Microsoft, Apr. 7, 2010.*
No stated author; R1—Advanced Server-Side Authentication for Data Connections in InfoPath 2007 Web-Based Forms; 2007; Retrieved from the Internet <URL: msdn.microsoft.com/en-us/library/bb787184(v=office.12).aspx>; pp. 1-7 as printed.*
No stated author; R2—Microsoft.Office.Server.ApplicationRegistry.MetadataModel Namespace; 2010; Retrieved from the Internet <URL: msdn.microsoft.com/en-us/library/microsoft.office.server.applicationregistry.metadatamodel.aspx>; pp. 1-2 as printed.*
No stated author; R3—Microsoft.Office.DocumentManagement Namespace; 2010; Retrieved from the Internet <URL: msdn.microsoft.com/En-US/library/office/microsoft.office.documentmanagement(v=office.14).aspx>; 1 page as printed.*
Project Server 2010 Architecture—Published Date: May 2010. http://msdn.microsoft.com/en-us/library/ee767687.aspx. pp. 5.
Web Parts that Host External Applications Such as Silverlight. Published Date: May 2010. http://msdn.microsoft.com/en-us/library/ee535524.aspx. pp. 5.
Custom composite application discovery. Retrieved Date: Jun. 21, 2011. http://publib.boulder.ibm.com/infocenter/tivihelp/v17r1/index.jsp?topic=/com.ibm.tivoli.tpm.chg.doc_5.1.0.2/discovery/rdsc_TADDMcust.html. pp. 3.
"Work with Others the Easy Way with Office Live Workspace", retrieved at <<http://officeliveoffers.com/Workspace/sharing/default.htm?cid=09C6EA06-756E-4C94-B5CE-E4991DE9F87F>>, Nov. 10, 2008, p. 1.
"Office Applications Toolkit", retrieved at <<http://news.zdnet.co.uk/software/0,1000000121,39523769,00.htm?r=1>>, Oct. 21, 2008, pp. 5.
"Office OCX & Office Component", retrieved at <<http://www.officeocx.com/>>, Nov. 10, 2008, pp. 3.
"Google Docs", retrieved at <<http://www.google.com/google-d-s/intl/en/tour1.html>>, Nov. 10, 2008, p. 1.
Perez, Sarah, "Office Live Workspace Vs Google Docs: Feature-by-Feature Comparison", retrieved at <<http://www.readwriteweb.com/archives/office_live_workspace_vs_google_docs_feature_by_feature.php>>, Nov. 10, 2008, pp. 11.
Bean, Liam "Web based Office Suites", retrieved at <<http://hubpages.com/hub/Web-Based-Office-Suites>>, Nov. 10, 2008, pp. 7.
Office Action mailed Sep. 3, 2010, in co-pending U.S. Appl. No. 12/354,928.
Office Action mailed Jan. 25, 2011, in co-pending U.S. Appl. No. 12/354,928.
Notice of Allowance mailed Dec. 14, 2011, in co-pending U.S. Appl. No. 12/354,928.
International Search Report and Written Opinion for PCT/US2012/057670 mailed Mar. 4, 2013.
International Search Report and Written Opinion for PCT/US2012/057657 mailed Mar. 25, 2013.
Chinese Office Action dated Sep. 3, 2014 in Appln No. 201210364186.x, 14 pgs.
Chinese Office Action dated Jan. 7, 2015 in Appln No. 201210364421.3, 15 pgs.
Bourquin; Google Apps as an Alternative to Microsoft Office in a Multinational Company. The GAPS Project. Published May 31, 2010; irecouillard.weebly.com/uploads/5/1/9/8/5198042/collaborative_computing_to_improve_work_process_final.pdf. pp. 79.
Couillard; Collaborative Computing to Improve Work Process: Document Collaboration. Published Mar. 2011. http://clairecouillard.weebly.com/uploads/5/1/9/8/5198042/collaborative_computing_to_improve_work_process_final.pdf. pp. 8.
harmon.ie. Editing Documents. Retrieved Jun. 22, 2011. http://www.mainsoft.comIspnotes-20-doc/editingdocuments. pp. 2.
Joining Dots. SharePoint and Office Web Apps. Published Jul. 12, 2010; http://www.joiningdots.com/blog/2010/07/sharepoint-and-office-web-apps/. pp. 6.
Microsoft/TechNet. Office Web Apps overview (Installed on SharePoint 2010 Products). Published Aug. 27, 2010. http://technet.microsoft.com/en-us/library/ff43168S.aspx. pp. 8.
Notice of Allowance dated Feb. 3, 2012, issued in U.S. Appl. No. 12/354,928, 9 pgs.
Office Action dated Jan. 6, 2014, issued in U.S. Appl. No. 13/284,543, 18 pgs.
Office Action dated Aug. 27, 2014, issued in U.S. Appl. No. 13/284,543, 13 pgs.
Office Action dated Jan. 29, 2015, issued in U.S. Appl. No. 13/284,543, 12 pgs.
"Supplementary European Search Report Issued in Application No. 12836757.0", Mailed Date: Mar. 25, 2015, 5 Pages.
Chinese Second Office Action dated Sep. 6, 2015 in Appln No. 201210364421.3, 12 pgs.
Office Action dated Sep. 23, 2015, issued in U.S. Appl. No. 13/284,543, 12 pgs.
EP Extended Search Report dated Jul. 30, 2015 in Appln No. PCT/US2012/057670, 9 pgs.
Chinese Third Office Action Issued in Patent Application No. 201210364186.X, Mailed Date: Nov. 23, 2015, 12 Pages.

* cited by examiner

Mobile Computing Device

HOST AGNOSTIC INTEGRATION AND INTEROPERATION SYSTEM

CROSS-REFERENCE TO RELATED APPLICATIONS

This application claims the benefit of U.S. Provisional Application No. 61/539,975, filed Sep. 27, 2011, the disclosure of which is hereby incorporated by reference in its entirety.

BACKGROUND

Enterprises often maintain various types of documents that are stored in different places for different purposes. In many cases, such documents are created and stored according to a variety of different software applications and storage systems. For example, documents may be generated using word processing applications, spreadsheet applications, presentation applications, note applications, graphic design applications, photographic applications, and the like. Meaningful access to a particular type of document has historically required a local installation of an application supporting that document type, even to simply view the document.

With the widespread use of mobile computing and web based hosts, such as web mail servers and content servers, the need to access a document from a computing device lacking a local installation of the supporting application has become increasingly common. In response, attempts to provide support for selected document types through the web based host so as to avoid the need for a local installation of the supporting application have been made. Typically, this has been approached in one of two ways. First, some web based hosts natively support viewing widely used document types through embedded applications. Full support including document editing is not offered by the embedded applications. Second, external applications designed to integrate with web based hosts have been developed. Integration of an external application and a host generally requires each of these two programs to have specific knowledge of the application programming interface of the other. The external applications designed for integration with a particular host are generally required to participate in the authentication scheme(s) used by the host. Moreover, because the external application is generally given broad access to the host content, a two-way certificate exchange is commonly used to establish a trust relationship between the host and the external applications. As a result, external applications are not portable or useful with a significant number of hosts. Use of the external application is limited to a specific host, and support for various document types is limited to the available external applications designed for a particular host. It is with respect to these and other considerations that the present invention has been made.

BRIEF SUMMARY

The following Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

In the various embodiments, the host agnostic integration and interoperation system includes an open platform interface and the associated conventions that define the roles of and direct operations between a host and a service application running on an external application server and allow the host to discover and integrate the functionality provided by the service application. The open platform interface employs a limited number of easily implemented semantic methods allowing a host to expose and integrate the ability to view, edit, or otherwise manipulate a document using the host supported functionality of the service application from a standard user agent. The host agnostic integration and interoperation system handles user authentication at the host using an access token and establishes a trust relationship between the host and the external application server using a lightweight but secure proof key system.

A user accesses a host via a user agent from a client computing device. An external application server runs one or more web based service applications enabling the user to access, view, edit, and, optionally, perform other actions on content (i.e., a file or document) and perform folder (i.e., directory) management over the network from the client computing device without requiring a local installation of the appropriate application(s) needed to work with a particular document type. The host learns about and integrates the functionality that is provided by the external application server through a discovery process. After completing the discovery process, the behavior of the host changes based on the availability and functionality of the external application server. The external application server uses the open platform interface to integrate and communicate with the host. Through a service application, the external application server provides the necessary actions and functionality to work with a document of a selected file type.

The open platform interface is built on basic communication mechanisms that are well-established and common to most, if not all, platforms and operating systems. The fundamental communication mechanism utilized by the open platform interface for virtually all communications is a basic request-response protocol. Transactions are implemented as a standard HTTP or HTTPS request against a uniform resource locator (URL) with a host generated access token appended for authentication. All of the calling information is enveloped in the URL, the headers, and, as necessary, the body of the request. A request sent by the open platform interface client (i.e., the external application server) includes a proof header used by the open platform interface host to verify the identity of the requester. All of the reply information is contained in the URL, the headers, and, as necessary, the body of the response.

The basic format for a request or a response typically includes one or more request headers for carrying general and/or method specific information and an optional request body when needed for carrying data. Additionally, the response returns a status code indicates either the success of the operation or indicates one of possibly several different error conditions. The request is posted to the address of an entry point or an endpoint of either the host or the external application server together with any required and optional parameters associated with the request. The following discussion describes one exemplary embodiment of the open platform interface. This example is not intended to limit the features and functionality provided by the open platform interface in any manner.

The headers used by open platform interface include the standard request headers, the standard response headers, and the error response headers. Additionally, the open platform interface includes specific additional headers for selected methods. The standard request headers, the standard response headers, and the error headers are used to handle diagnostic functions and communicate interface level information not specific to the request (i.e., general information). The error response headers are used in conjunction with the status code returned by the response. The status code provides a standard value defined by the open platform interface that indicates whether or not the request succeeded, and, if not, identifies the type of error encountered by the request. The body contains either metadata or binary data or is empty depending upon the request. The caller (i.e., the external application server or service application) interprets the data in the response body based on the request made by the caller. A basic data interchange or markup format serves as the fundamental data transport mechanism for metadata.

Communications between the external application server and the host are considered trusted because the host always initiates the transaction on behalf of the user. The host agnostic interface and interoperability system employs an optional proof system that allows the host to verify the identity of the requester and add an additional layer of trust. The proof system uses requests (i.e., calls) that carry proof of the identity of the caller. To implement the proof system, the host must obtain a cryptographic key (i.e., the proof key) specific to the external application server. The proof key provides the host with a mechanism by which to verify that a request was, in fact, made by the trusted external application server. The host uses its copy of the proof key to confirm that the cryptographic signature was generated using the corresponding private key.

The open platform interface uses an access token to uniquely identify a transaction. Moreover, the access token provides an authentication mechanism for the communications related to that transaction and eliminates the need for the external application server (i.e., the open platform interface client) to participate in a particular authentication scheme generally used by the host. The access token is a token that is unique to the user/document pair that the host endpoint uses to authenticate the user and authorize access to the document. In various embodiments, the access token is a hash of one or more of the user identifier, the time stamp, and the document identifier and is encrypted with a secret known to the host.

The use of host initiated transactions allows the host agnostic interface and interoperability system to rely on host side authentication and avoids the need for the external application server to natively authenticate the user. In other words, the user always does some action (e.g., a user interface action or gesture) on the host that indicates the user wants to start interacting with a document in a particular way (e.g., editing, mobile viewing, etc.). The host always has an opportunity to contemporaneously generate an access token that is bound to the user and the document, has a relatively short lifespan, and can be subsequently validated by the host. The open platform interface does not require the host to use a particular scheme to generate the access token, and the host can use any of a variety of known access token generation schemes or a new one for this purpose. The service application does not need to know anything about the access token except that it exists and that is optionally associated with a particular object (i.e., it is likely tied to a particular user and file). The actual contents of the access token are entirely opaque to the service application. The service application simply includes the access token in communications with the host involving the associated transaction. Because the host does not have to make the access token intelligible to the external application server, the host is able to use any information to tie the access token to the particular user and file and to ensure that the access token is not valid indefinitely.

The methods supported by the host agnostic interface and interoperation system are defined by the open platform interface and the associated conventions. Each method is called using a HTTP request directed to the URL associated with the verb and includes a resource identifier uniquely identifying the target resource of the method and, optionally, the access token as a request parameter. The external application server advertises the availability of the methods in the form of a list of functional sets. Each functional set is declared by string and promises the implementation a set of methods supported by the open platform interface. In turn, the host advertises which functional sets it supports. Accordingly, the external application server knows whether to provide certain functionality based on the capabilities of the host. More specifically, if the host does not advertise support for specific functionality, the service application suppresses any features that require the unsupported functionality.

The declaration, implementation, and consumption of functional sets serve as the primary extensibility mechanism of the open platform interface. A functional set is made up from one or more verbs describing a method supported by the interface. Each verb defines the format and content of the requests and responses between the host and the external application server for a particular method of the interface. In general, the definition of each verb describes the format (i.e., the URL structure) of the request, the request headers, any information that is required or optionally included in the request body, the status codes, the error response headers, the response headers, and any information that is included in the response body.

The host agnostic integration and interoperation system takes advantage of selected service oriented architecture principles and methodologies that contribute to a high level of cross-version compatibility between the versions of the open platform interface implemented by the open platform interface host and clients. Various embodiments of the host agnostic integration and interoperation system adhere to the service oriented architecture principles of "ignore what you weren't expecting" and "use default values for data you were expecting but didn't get." Specifically, the metadata object notation is constructed in such a way that it is acceptable for the response body to include objects that are not recognized by the recipient. In other words, if the response body includes more data than the recipient was expecting, the unexpected data is ignored. Alternatively, if the response body omits data that the recipient expects, default values for the missing data are used. Further, some embodiments of the open platform interface adopt the semantic of "default values must result in acceptable behavior." In this instance, the open platform interface treats misconfigured, invalid, unusable, or otherwise non-functional default values as unexpected data and ignores them.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

A host agnostic integration and interoperation system is described herein and illustrated in the accompanying figures. The host agnostic integration and interoperation system includes an open platform interface and the associated conventions that define the roles of and direct operations between a host and a service application running on an external application server and allow the host to discover and integrate the functionality provided by the service application. The open platform interface employs a limited number of easily implemented semantic methods allowing a host to expose and integrate the ability to view, edit, or otherwise manipulate a document using the host supported functionality of the service application from a standard user agent. The host agnostic integration and interoperation system handles user authentication at the host using an access token and establishes a trust relationship between the host and the external application server using a lightweight but secure proof key system.

Figure 1:
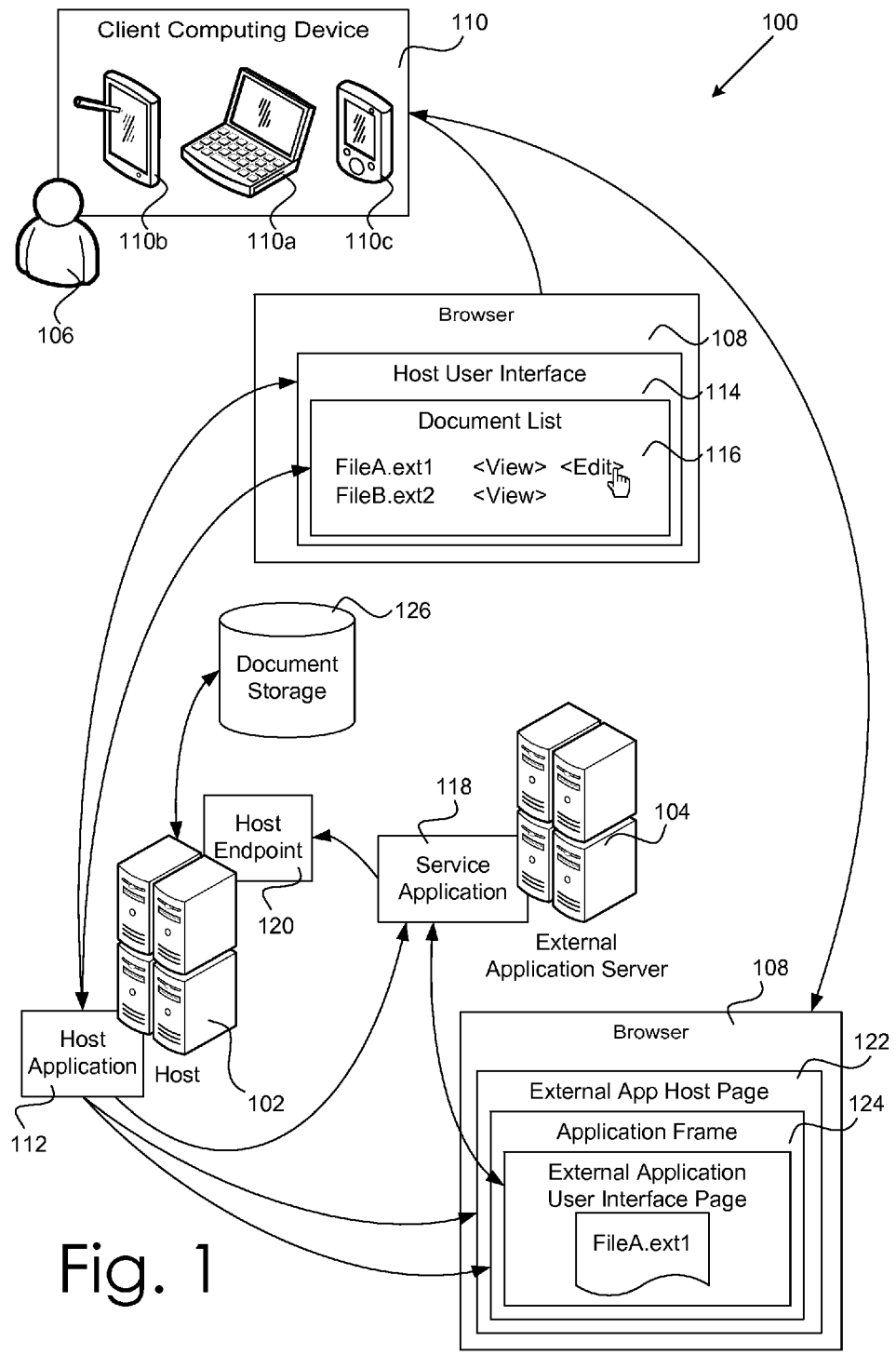
FIG. 1 illustrates a block diagram of an enterprise network employing one embodiment of the open platform interface.
Figure 2A:
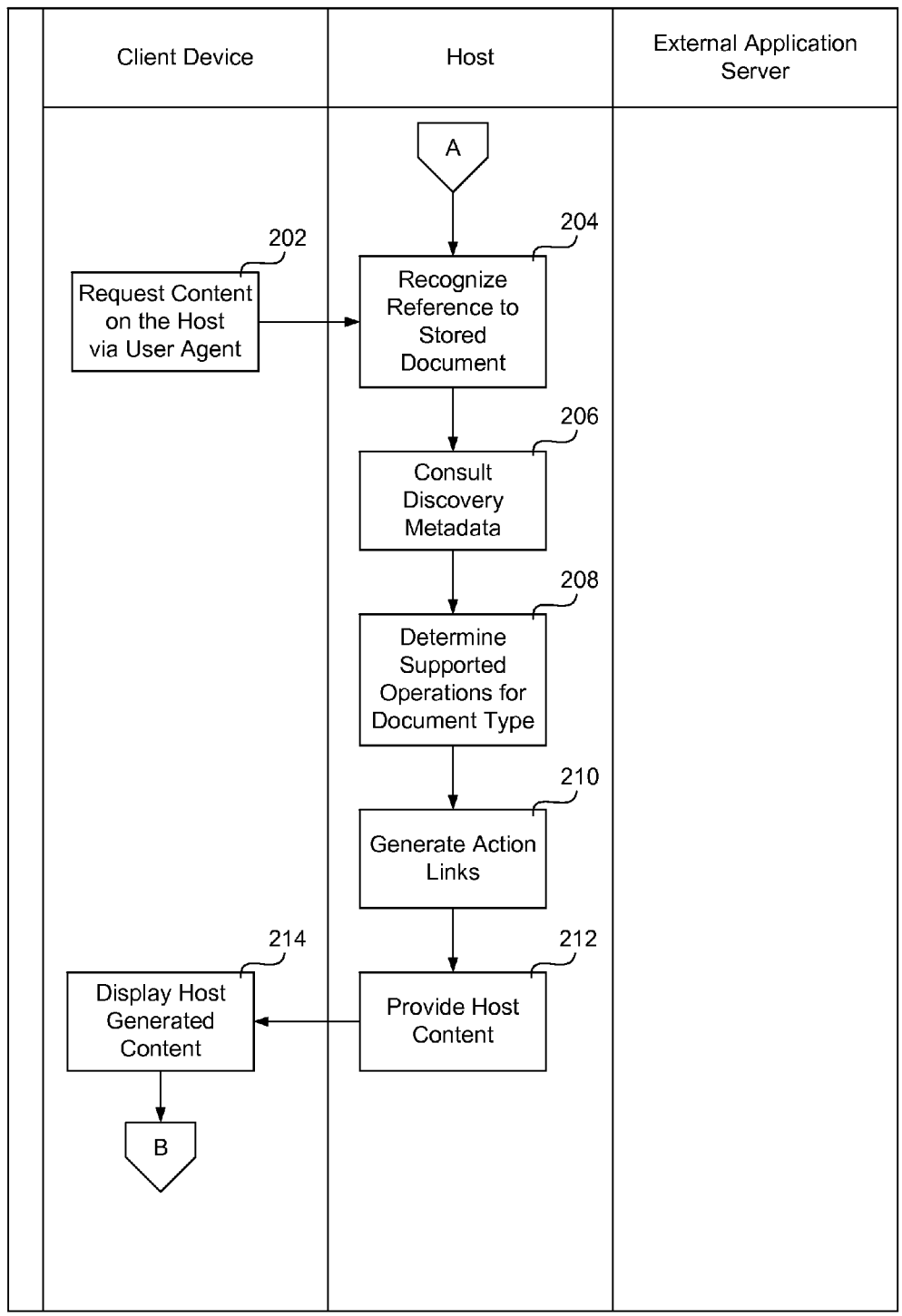
FIGS. 2A to 2E illustrate one embodiment of the process for accessing documents stored by the host using the functionality of the external application server using a client computing device.
Figure 2B:
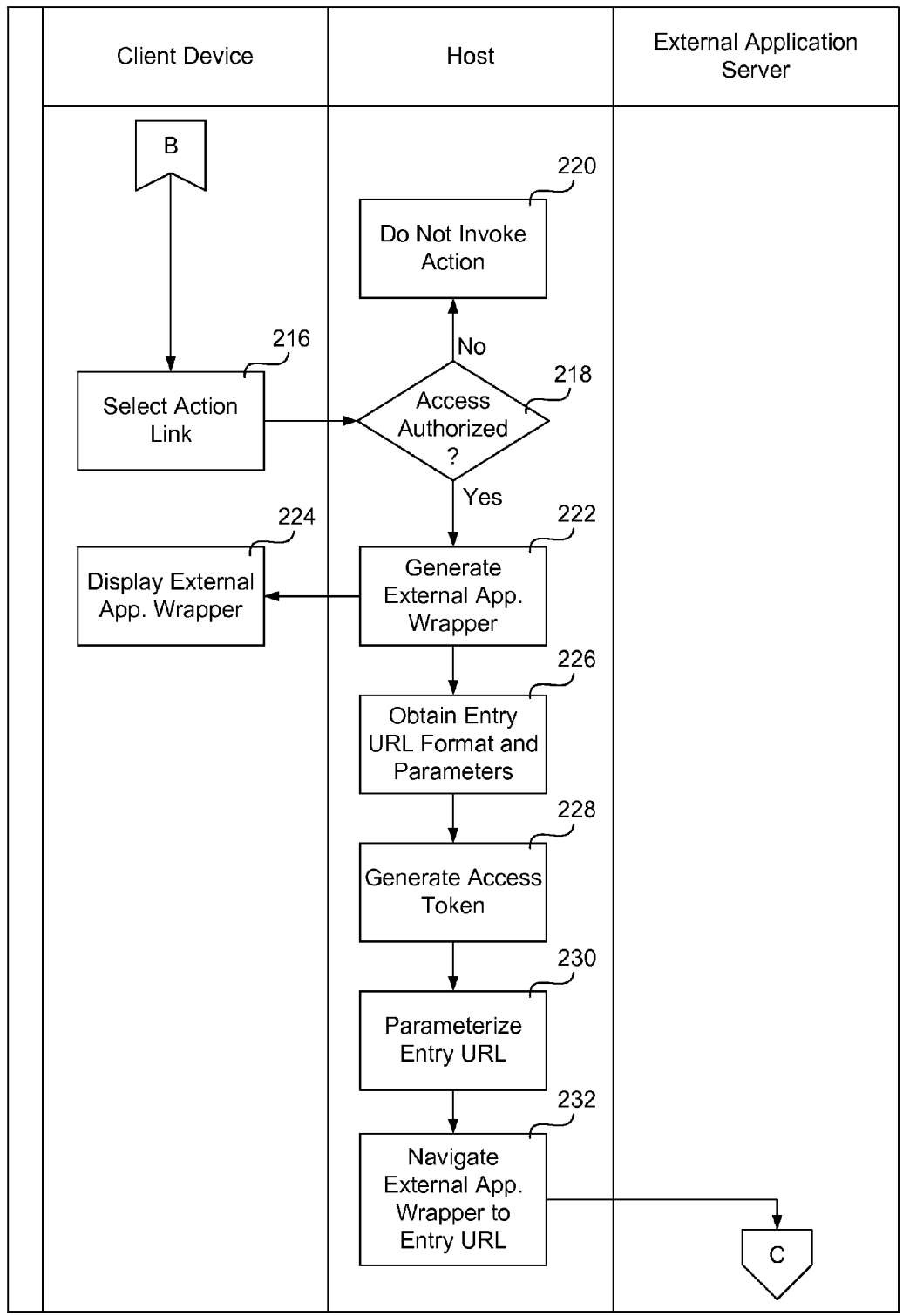
Figure 2C:
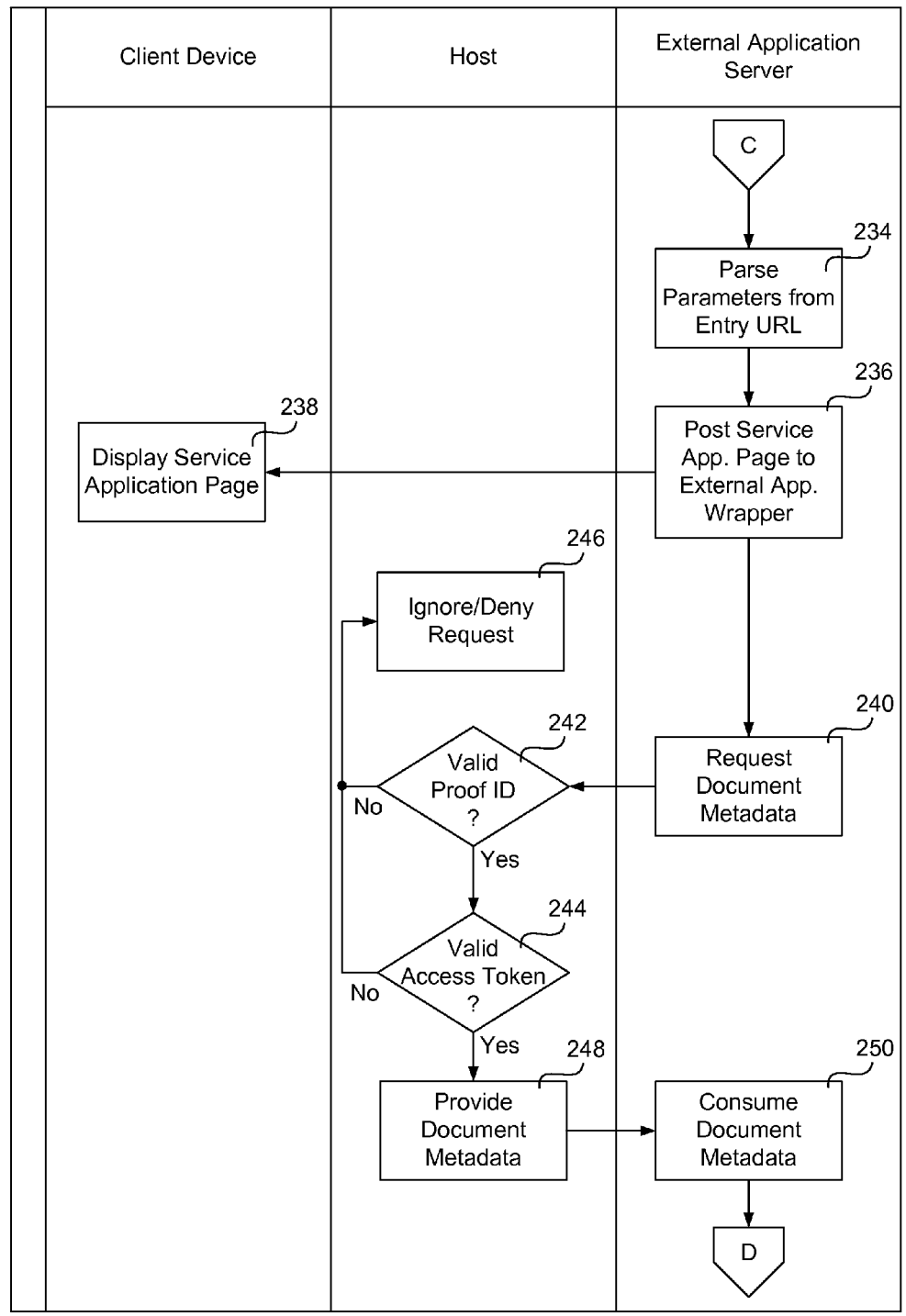
Figure 2D:
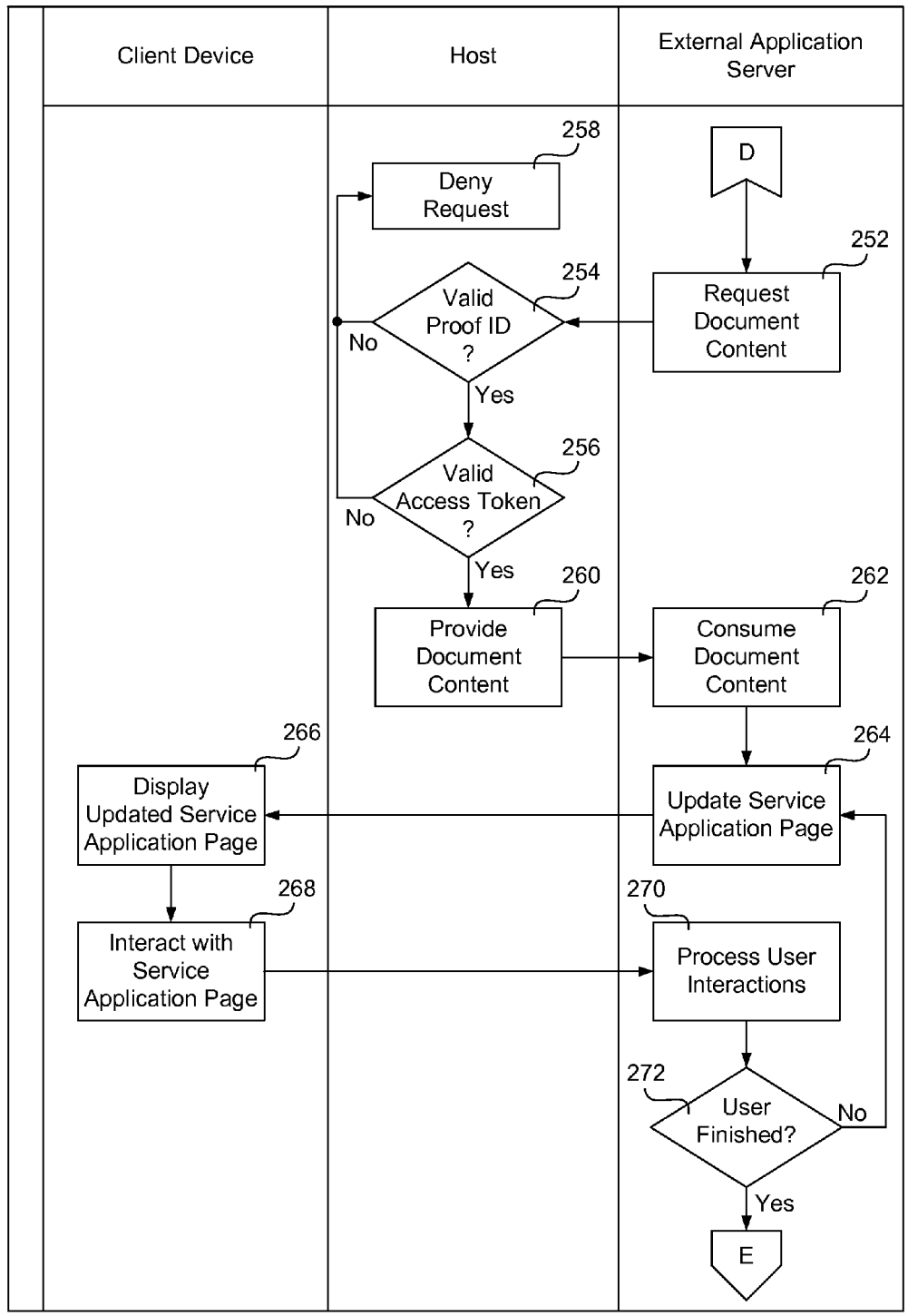
Figure 2E:
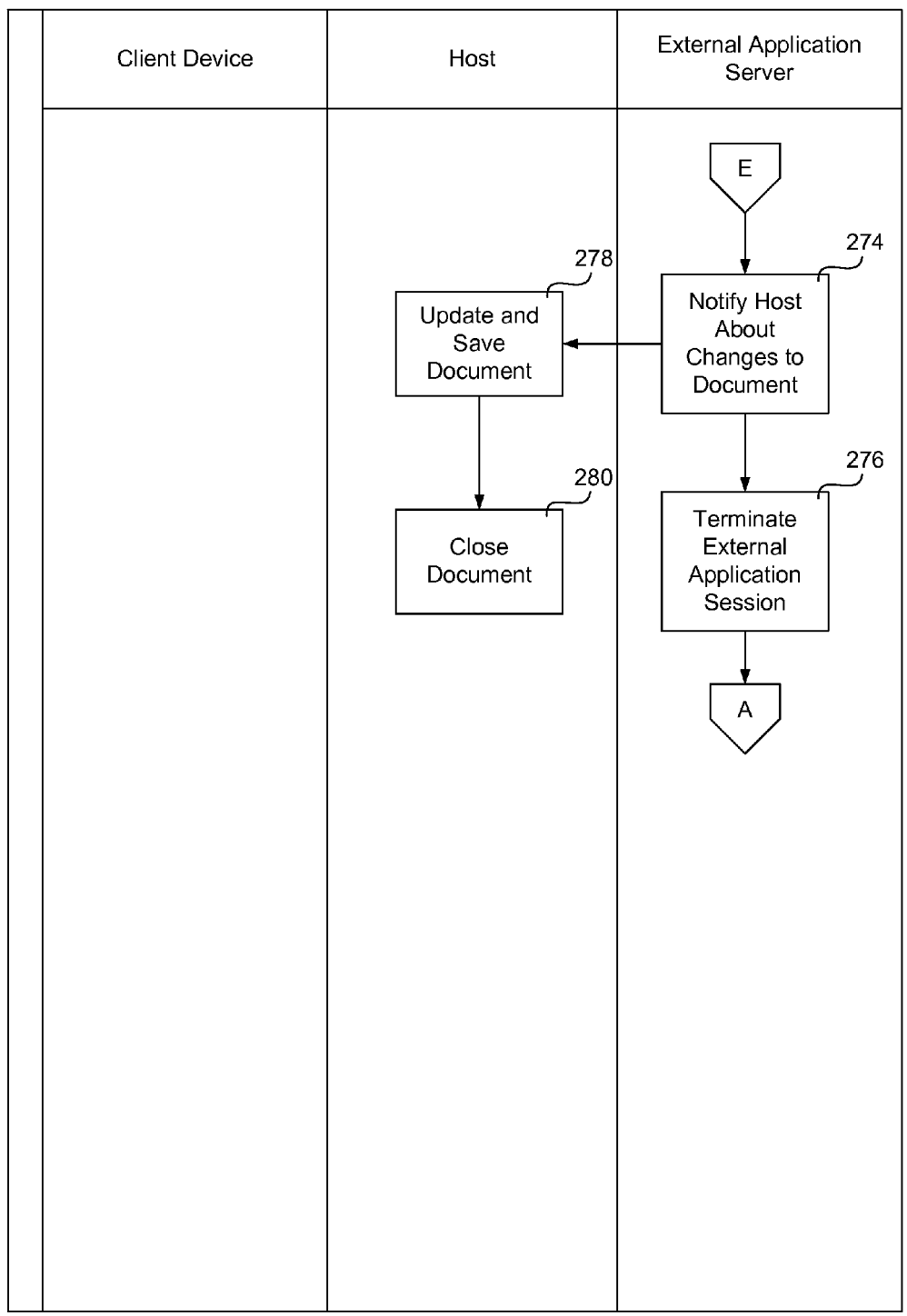

FIG. 1 illustrates one embodiment of an exemplary enterprise network including one or more hosts 102 and one or more external application servers 104. A user 106 accesses the host 102 via a user agent 108 from a client computing device 110. The host 102 is, most generally, a content server that stores documents in a document storage system 126 and manages permissions for the user 106. Generally, the host 102 runs a host application 112 and the normal functions of the host application 112 are handled through the host user interface 114. At least some of the normal functions of the host application 112 involve providing the user with access to stored documents 116 contained in a content store 126 and intended to be viewed and/or edited using a supporting application. The host 102 also provides a general platform to make the services of the external application server 104 available to the user 106. In other words, the host 102 provides entry points to the external application server 104 and provides the portal through which the user 106 and the external application server 104 interact. A shared communication interface defines and directs document actions between the host 102 and the external application server 104. The host 102 also implements an endpoint 120 to receive communications from the external application server 104. Although the host 102 initiates scenarios involving the services of the external application server 104, the host 102 does not make calls to the external application server 104. Instead, the external application server 104 exposes supported functionality to operate on supported document types using callbacks.

The external application server 104 runs one or more web based service applications 118 enabling the user 106 to access, view, edit, and, optionally, perform other actions on content (i.e., a file or document) and perform folder (i.e., directory) management over the network from the client computing device 110 without requiring a local installation of the appropriate application(s) needed to work with a particular document type. The action and output of the external application server 104 is not specific to the host 102 that invokes the functionality of the external application server. Each service application 118 generally runs as a service on the external application server 104. The external application server 104 uses the open platform interface to integrate and communicate with the host 102. Through a service application 118, the external application server 104 provides the necessary actions and functionality to work with a document of a selected file type. Examples of the service applications 118 handling various document types include the web based companions to the standard (i.e., locally installed) applications for working with word processing documents, spreadsheets, notes, and presentations. The actions provided by each service application 118 are typically specific to a selected file type or related to folder management. The core actions provided by the service application 118 include viewing and editing documents. In various embodiments, the service application 118 provides one or more additional actions including, but not limited to, reformatting a document for viewing on a mobile device, creating a new document, converting a document, embedding a document, and broadcasting a document.

The host 102 is an online server application capable of being accessed over a network using a user agent 108, such as a web browser from the client computing device 110. The functionality provided by the external application server 104 are consumed by the host 102 and made available to the user 106. Examples of suitable host systems include, but are not limited to, mail systems allowing web based access (e.g., Microsoft Exchange Server®), unified communication systems (e.g., IBM Lotus Sametime®, Microsoft Lync®, and Unison®), and content and/or document management systems (e.g., IBM Lotus Quickr® and Microsoft SharePoint®). As a content server, the host 102 stores the user's data (i.e., documents) and initiates scenarios involving the external application server 104 to view, edit, or otherwise manipulate the user's data. Under the open platform interface, the host 102 handles file system operations at the requested of the external application server 104. Other responsibilities of the host 102 typically include handling access control to documents at the user level and license enforcement for the external application server 104.

The host 102 implements the service application wrapper 122 displayed in the user agent on the client computing device 110. The service application wrapper 122 is a web page and/or frame (e.g., an inline frame) generated by the host 102 that serves as a viewport for the output (i.e., the web based user interface) of the service application 118. The service application wrapper 122 optionally includes an inner application frame 124 that displays the user interface pages of the service application 118 while the service application wrapper 122 optionally presents host chrome (i.e., a host provided look and feel) and navigation control(s).

When the user 106 selects an action for a particular document, that action is invoked by a request made to a service application entry URL for the service application supporting that document type. The service application entry URL points to an address for a service application on the external application server 104. The base of the service application entry URL is, most typically, the address of the external application server 104. The host 102, typically through the service application wrapper 122, generates and appends the parameters associated with the selected action to the service application entry URL. The parameters specify the task (e.g., embedded edit using the spreadsheet application) and the required data to accomplish the requested task.

The host 102 also implements and exposes the host endpoint 120 for receiving communications from the external application server. The host endpoint 120 is a web service that understands requests made using the open platform interface. Some embodiments of the open platform interface exclusively use a secure transport protocol (e.g., HTTPS) for communications with the host endpoint 120 in order to protect the access token and the content of the document. In one embodiment, the URL of the host endpoint 120 is created by appending the location of the host endpoint web service to the domain name of the host.

While it is entirely possible and acceptable to manually configure the host 102 for integration with the external application server 104, various embodiments of the open platform interface provides an automated external application server discovery process to accomplish this task. Prior to beginning the external application server discovery process, the host 102 is not required to have any knowledge of the availability or functionality of an external application server 104. To participate in the external application server discovery process, the host 102 must understand the open platform interface and the discovery conventions. After completing the external application server discovery process, the behavior of the host 102 changes based on the availability and functionality of the external application server 104.

During the discovery process, the host 102 learns the file formats and the open interface protocol methods (i.e., verbs) that are supported by the external application server 104. The discovery process begins with the host 102 issuing a discovery request and receiving a discovery response message containing the discovery metadata describing the functionality supported by the external application server (i.e., the properties of the external application server). The discovery metadata is formatted according to and contains information specified by the conventions of the open interface protocol. In various embodiments, the discovery metadata contains information such as an identifier for the external application, a description of the external application, a file extension, an action associated with the file extension, any open interface protocol implementation requirements for the host (e.g., functional sets), the location of the external application responsible for handling the actions, and/or a mime type for the documents associated with the file extension, and a copy of the public proof key for participating in the security scheme. In one embodiment, a human and machine readable identifier (e.g., a string value) for the supporting application is associated with each file type/action pair. The host 102 consumes the discovery metadata and registers the functionality of the external application server 104 as part of the host configuration.

Each action is defined by the conventions of the open interface protocol. The host 102 chooses to make use of or ignore individual actions based on the conventions of the open protocol interface understood by the host 102 at the time. In one embodiment, the host 102 verifies that it supports the requirements for the action before registering the paired file type and action. If the host 102 does not support the action and/or meet the hosting requirements, the paired file type and action is not registered. More specifically, in some embodiments, the host uses the "requires" attribute, which specifies the open interface protocol implementation requirements, to filter out actions the host cannot support. In other words, if the host does not recognize or understand all the fields listed in the "requires" attribute value or chooses not to support that convention of the open interface protocol, the host does not register (i.e., implement) the paired file type and action and does not offer that functionality to the user.

The configuration, functionality, and level of implementation of the open platform interface and the associated conventions by the host determine the effective functionality of external application server available to the user 106. If the host 102 does not fully implement the open platform interface or does not meet the requirements for certain functionality of the external application server 104, that functionality is not available to the user 106. More specifically, if the host 102 does not advertise support for specific functionality, the external application server 104 suppresses any features that the host cannot support. For example, the external application server 104 should not allow the user 106 to edit a document when the host 102 is not capable of saving an updated copy of the document.

Additionally, the discovery metadata describes the parameters used in the external application entry URL associated with each action. As with actions, the service application entry URL parameters are specified by convention in the open interface protocol. Some parameters are required and others are optional. If the host does not understand a required parameter, the host does not register the action. Conversely, when an optional parameter is not understood, the host may choose to register the action. In such case, the functionality associated with the optional parameter is simply lost, but the host is still able to provide the action with as much functionality as the host understands.

Handling the discovery of actions and parameters in this manner provides the basis for the robust cross-version compatibility enjoyed by the open platform interface. Even if an upgrade of the external application server provides new functionality that is not supported or understood by the host, the host continues to work with the upgraded external application server. The host simply continues to provide support for the functionality it understands and ignores any functionality it does not understand.

The open platform interface is built on basic communication mechanisms that are well-established and common to most, if not all, platforms and operating systems. The fundamental communication mechanism utilized by the open platform interface for virtually all communications is a basic request-response protocol, such as hypertext transport protocol (HTTP) or hypertext transport protocol secure (HTTPS). A transaction is generally implemented as a standard HTTP request against a uniform resource locator (URL) with a host generated access token appended for authentication. All of the calling information is contained in the URL, the headers, and, as necessary, the body of the request. In other words, the request envelopes a bunch of information such as the object to operate on, the operation to perform, the optional proof provided by the caller, and various other bits of metadata. Some requests also contain a body enveloping data in the exchange format associated with the operation. When present, the data in the body represents payload of the operation described in the envelope. Accordingly, requests that happen to carry a payload must continue to present the required envelope information in the query-string/http headers and cannot use the body of the request as an alternate transport mechanism. The same is true of responses, though there are more payloads, as some responses match metadata payloads with requests that have no payload and file contents are always transferred as payloads in the response body A request sent by the open platform interface client (i.e., the external application server) optionally includes a proof header used by the open platform interface host to verify the identity of the requester. All of the reply information is contained in the URL, the headers, and, as necessary, the body of the response. This eliminates the need for a very specific metadata exchange beforehand required by some prior art interfaces.

The basic format for a request or a response typically includes one or more request headers for carrying general and/or method specific information and an optional request body when need for carrying data. Additionally, the response returns a status code that whether or not the request was successful. The request is posted to the address of an entry point or an endpoint of either the host or the external application server together with any required and optional parameters associated with the request. The following discussion describes one exemplary embodiment of the open platform interface. This example is not intended to limit the features and functionality provided by the open platform interface in any manner.

The headers used by open platform interface include the standard request headers, the standard response headers, and the error response headers. Additionally, the open platform interface includes specific additional headers for selected methods. The standard request headers, the standard response headers, and the error headers are used to handle diagnostic functions and communicate interface level information not specific to the request (i.e., general information). The error response headers are used in conjunction with the status code returned by the response. The status code provides a standard value defined by the open platform interface that indicates whether or not the request succeeded, and, if not, identifies the type of error encountered by the request.

The standard request headers specify the interface version of the external application server (i.e., the caller or the interface client), the machine name of the external application server, and the correlation identifier used to synchronize the logs from the client with the logs from the host for logging and/or debugging purposes and allow the external application server to request a performance trace from the host (i.e., the responder or the interface server). The standard response headers specify the interface version of the host, the machine name of the host, and, if requested, the output of the performance trace. The response codes defined by the open platform interface include code 200 indicating success/no error, code 404 indicating that the file is unknown or the user is unauthorized, code 409 indicating that the resource lock is mismatched, the resource is locked by another interface, or the filename specified in the PutRelativeFile request is in use and the overwrite behavior is not required, code 412 indicating that the file is larger than the maximum expected size, code 413 indicating that the file is too large, code 500 indicating a server error, and code 501 indicating that the verb is not implemented by the server/host. The response error headers include a server error header to describe the server error when code 500 is returned and, when code 409 is returned, either a lock header specifying the unique identifier of the lock created using the open platform interface, or a locked by another interface flag indicating that the lock on the target resource was not created using the open platform interface.

The open platform interface recognizes two different content types in the body of a request or a response. Depending on the request, the body contains either metadata or binary data. The content type of the response body depends on the request made. The caller (i.e., the external application server or service application) interprets the data in the response body based on the request made by the caller. A basic data interchange or markup format serves as the fundamental data transport mechanism for metadata. In most embodiments, the basic data interchange or markup format is both machine readable and human readable. One suitable object notation format used by various embodiments of the open platform interface for the data transport mechanism is JavaScript Object Notation (JSON); however, other object notation formats may be used without departing from the scope and spirit of the present invention.

The host begins a transaction (i.e., invokes an action) by making an HTTP GET request to the service application wrapper against the service application entry URL. When initiating a transaction, the host provides a metadata URL (i.e., the callback URL or source URL). All subsequent communications in the transaction are initiated by the external application server. The metadata URL is a reference to the host endpoint, which is the address that the service application uses when making an HTTP request to the host. The HTTP requests are used to call a host side method for performing a resource related function.

The open platform interface defines a limited number of easily implemented and widely supported semantic methods for performing some or all of the following functions including, but not limited to: get file metadata (CheckFileInfo), get folder metadata (CheckFolderInfo), get the binary content of a file (GetFile), save the binary content of a file (PutFile), save a copy of the binary content of a file (PutRelativeFile), lock a file (Lock), unlock a file (Unlock), renew the lock on a file (RefreshLock), unlock and relock a file (UnlockAndRelock), execute a local virtual application (ExecuteCobaltRequest), execute a remote virtual application (ExecuteCobaltRelativeRequest), enumerate the contents of a folder (EnumerateChildren), and delete a file (DeleteFile). The method for getting the metadata associated with a document and a method for getting the document content are considered the core methods of the open platform interface. Each method is called using an HTTP request to the service application wrapper (typically, the inner frame) against the metadata URL or another host endpoint URL and includes a resource identifier uniquely identifying the target resource (e.g., the file or folder) of the method and, optionally, the access token as a request parameter. In most cases, the callback URL is either the metadata URL or the content URL for the target resource type.

The CheckFileInfo request is a GET request made against the file metadata URL and supports the standard request headers. The CheckFileInfo request supports inclusion of the access token as an optional parameter. The CheckFileInfo request body is empty or omitted. The supported CheckFileInfo error codes are code 200, code 404, and code 500. The CheckFileInfo response supports the standard response headers, and the CheckFileInfo response body contains the file metadata in an object notation format.

The core file metadata includes, but is not limited to, one or more of the file version specifying a unique and non-repeating value that changes when the file changes, the base filename specifying the filename including the extension but without the path, the owner identifier specifying a unique identifier for the owner of the resource (used for throttling and consistent hashing), the file size of the current version of the file, and the file hash code containing a Base64 encoded SHA256Hash of the document content used for cache management (SHA256Hash). The optional file metadata includes, but is not limited to, one or more of the client URL specifying the address used by the external application server to access the resource, the download URL specifying the address triggering the native download function of the user agent, the close URL specifying the target address for the service application wrapper when the resource is closed, the full screen URL specifying the address of the host provided full screen view page, the host view URL specifying the address of the host provided view page, the host edit URL specifying the address of the host provided edit page, the host embedded view URL specifying the address of the host's embedded viewer for the document type (if different from the host view URL), the host embedded edit URL specifying the address of the host's embedded editor for the document type (if different from the host edit URL), the user write permission flag indicating whether or not the user has write permissions for the resource, the read only flag indicating whether or not the resource is read only for all users, the public flag indicating whether or not the resource is accessible to all users, the hide formulas flag indicating whether or not spreadsheet formulas are visible to the user, the update support flag indicating whether or not the host supports file save operations, the lock support flag indicating whether or not the host supports file lock operations, the virtual application support flag indicating whether or not the host supports virtual applications (e.g., Cobalt applications), the container support flag indicating whether or not the host supports file system operations (list contents of a folder, delete files, etc.), the delete flag indicating whether or not the host supports file system delete operations, the file URL specifying the address for directly accessing the content of the file (i.e., without using the host endpoint content URL), the privacy URL specifying the address for displaying the host's privacy policy, and the terms of use URL specifying the address for displaying the host's terms of use.

The CheckFolderInfo request is a GET request made against the folder metadata URL and supports the standard request headers. The CheckFolderInfo request supports inclusion of the access token as an optional parameter. The CheckFolderInfo request body is empty or omitted. The supported CheckFolderInfo error codes are code 200, code 404, code 500, and code 501. The CheckFolderInfo response supports the standard response headers and the response body contains the folder metadata in an object notation format.

The core folder metadata includes, but is not limited to, one or more of the folder name specifying the folder name without the path, and the owner identifier. The optional file metadata includes, but is not limited to, one or more of the client URL, the close URL, the file hierarchy support flag indicating that the folder is a container, the delete flag, the user write permission flag, the public flag, the update support flag, the lock support flag, the virtual application support flag, the container support flag, the host view URL, the host edit URL, the host embedded view URL, the host embedded edit URL, the privacy URL, and the terms of use URL.

The GetFile content request is a GET request made against the file content URL. The GetFile content request supports the standard request headers and an optional extended request header specifying the expected maximum size of the file. The GetFile content request supports inclusion of the access token as an optional parameter. The GetFile content request body is empty or omitted. The supported GetFile error codes are code 200, code 404, code 412, and code 500. The GetFile response supports the standard response headers and an extended response header specifying the version (in the same form as the one returned by CheckFileInfo) of the file actually returned in the response. The GetFile response body contains the file content in a binary format.

The PutFile request is a POST request made against the file content URL. The PutFile request supports the standard request headers and additional headers specifying the size of the file (required), an override identifier (e.g., "PUT") to differentiate the various POST operations made to the same URL, and, optionally, the unique identifier for the file lock used during the save operation. The PutFile request supports inclusion of the access token as an optional parameter. The PutFile content request body contains the file content in a binary format. The supported PutFile error codes are code 200, code 404, code 409, code 413, code 500, and code 501. The PutFile response supports the standard response headers. The PutFile response body is empty or omitted.

The PutRelativeFile request is a POST request made against the file metadata URL. The PutRelativeFile request supports the standard request headers and additional headers specifying the size of the file, an override identifier (e.g., "PUT_RELATIVE"), the filename for the file copy, and whether or not overwriting the target file is permitted. The PutRelativeFile request supports inclusion of the access token as an optional parameter. The PutRelativeFile request body contains the file content in a binary format. The supported PutRelativeFile error codes are code 200, code 404, code 413, code 500, and code 501. The PutRelativeFile response supports the standard response headers. The PutRelativeFile response body contains the file metadata for the copy in an object notation format. If the file is successfully created, the file metadata includes, but is not limited to, the file metadata URL for the file copy, the host view URL for the file copy, and, optionally, the host edit URL for the file copy. If the file is not successfully created, the file metadata includes, but is not limited to, the suggested filename specifying an alternate file copy filename, a file exists flag indicating whether or not a file with the file copy filename supplied in the PutRelativeFile request already exists, and the illegal filename flag indicating whether or not the file copy filename supplied in the PutRelativeFile request is a legal filename.

The LockFile request is a POST request made against the file metadata URL. The LockFile request supports the standard request headers and additional headers specifying an override identifier (e.g., "LOCK") and the unique identifier for the file lock to be created. The LockFile request supports inclusion of the access token as an optional parameter. The lock file request body is empty or omitted. The LockFile error codes are code 200, code 404, code 409, code 500, and code 501. The LockFile response supports the standard response headers and an additional header specifying an existing lock. The LockFile response body is empty or omitted. The UnlockAndRelock request is a variant of the LockFile request that simply includes an additional parameter specifying the unique identifier of the file lock to be removed.

The UnlockFile request is a POST request made against the file metadata URL. The UnlockFile request supports the standard request headers and additional headers specifying an override identifier ("UNLOCK") and the unique identifier of the file lock to be removed. The UnlockFile request supports inclusion of the access token as an optional parameter. The UnlockFile request body is empty or omitted. The unlock file error codes are code 200, code 404, code 409, code 500, and code 501. The UnlockFile response supports the standard response headers. The UnlockFile response body is empty or omitted.

The RefreshLock request is a POST request made against the file metadata URL. The RefreshLock request supports the standard request headers and additional header specifying an override identifier (e.g., "REFRESH_LOCK") and the unique identifier of the file lock to be refreshed. The RefreshLock request supports inclusion of the access token as an optional parameter. The RefreshLock request body is empty or omitted. The RefreshLock error codes are code 200, code 404, code 409, code 500, and code 501. The RefreshLock response supports the standard response headers. The RefreshLock response body is empty or omitted.

The ExecuteCobaltRequest and ExecuteCobaltRelativeRequest requests are POST requests made against the file metadata URL. The ExecuteCobaltRequest and ExecuteCobaltRelativeRequest requests support the standard request headers and additional headers specifying the size of the file content, and an override identifier (e.g., "COBALT"). In the case of the ExecuteCobaltRelativeRequest request, an additional header specifying the relative target is supported. The ExecuteCobaltRequest and ExecuteCobaltRelativeRequest requests support inclusion of the access token as an optional parameter. The ExecuteCobaltRequest and ExecuteCobaltRelativeRequest request bodies carry the file content in Cobalt format. The supported error codes for the ExecuteCobaltRequest and ExecuteCobaltRelativeRequest requests are code 200, code 409, code 500, and code 501. The ExecuteCobaltRequest and ExecuteCobaltRelativeRequest responses support the standard response headers. The ExecuteCobaltRequest and ExecuteCobaltRelativeRequest response bodies carry the output of the virtual application in binary format. The ExecuteCobaltRequest and ExecuteCobaltRelativeRequest requests illustrate how the open platform interface includes enveloping functionality that allows arbitrary data protocols to be incorporated into the open platform interface as needed. The open platform interface identifies the object and provides the access to the object, but allows the object to utilize the arbitrary data exchange format that are understood by the both the client and the host. The open platform interface is not required to understand the arbitrary data exchange format. The enveloped object simply makes use of a different override header and declares itself as available in Check.

The EnumerateChildren request is a POST request made against the folder metadata URL. The EnumerateChildren request supports the standard request headers and the inclusion of the access token as an optional parameter. The EnumerateChildren request body is empty or omitted. The supported EnumerateChildren error codes are code 200, code 404, code 500, and code 501. The EnumerateChildren response supports the standard response headers. The EnumerateChildren response body contains a collection of resource metadata in object notation format. The resource metadata includes, but is not limited to, the metadata URL for the resource, the base filename or folder name, and the version of the resource (if a file).

The DeleteFile request is a POST request made to the file metadata URL. The DeleteFile request supports the standard request headers and an additional header specifying an override identifier (e.g., "DELETE"). The DeleteFile request supports inclusion of the access token as an optional parameter. The DeleteFile request body is empty or omitted. The DeleteFile error codes are code 200, code 404, code 409, code 500, and code 501. The DeleteFile response supports the standard response headers. The DeleteFile response body is empty or omitted.

The open platform interface incorporates information rights management (IRM) into the external service application for viewing only to allow user to open documents with information rights management restrictions through the use of the access token and the proof system. An easily understood scenario focuses on sending company confidential information to a large group. In this scenario, the sender needs to communicate the sensitive information to the employees of his or her organization but wants to ensure that they do not forward the document. The external service application serves as an excellent viewing option for this scenario as the user does not need to download the document to open it. In addition, the caching mechanism in the external service application will make this fast. However, without information rights management support the scenario is broken and users will receive an error dialog.

The open platform interface allows a user to retrieve a protected document from the host. All communication between the client, the host, and the external service application is recommended to be over a cryptographic communication protocol such as SSL or TLS to prevent an attacker from acquiring the user's authorization token. In order to support information rights management in the external service application, the CheckFileInfo incorporates three additional parameters: a protected file flag that indicates that a given file needs to be protected in browser and an optional IRM Template identifier specifying a name for and a description of a template that is displayed to the user. To prevent the user from retrieving unencrypted copies of documents the user has access to, requests include portions signed with a private key that only the external service application knows and the host can choose to reject any requests that do not provide proof as expected. The providing of proof keys at discovery time is a promise by the external application server to sign all requests. The host can choose to not initiate IRM sessions with an external application server that does not provide proof at discovery time. The external service application signs the request with both the current and old private keys. The host will accept the request only if one of these two signatures can be validated with its copies of the external service application's current or old public keys.

The host agnostic integration and interoperation system takes advantage of selected service oriented architecture principles and methodologies that contribute to a high level of cross-version compatibility between the versions of the open platform interface implemented by the open platform interface host and clients. Various embodiments of the host agnostic integration and interoperation system adhere to the service oriented architecture principles of "ignore what you weren't expecting" and "use default values for data you were expecting but didn't get." Specifically, the metadata object notation is constructed in such a way that it is acceptable for the response body to include objects that are not recognized by the recipient. In other words, if the response body includes more data than the recipient was expecting, the unexpected data is ignored. Alternatively, if the response body omits data that the recipient expects, default values for the missing data are used. For example, Boolean values default to "false" and all string values default to "empty" and integer values default to zero. Any other data type with a clear default value could be introduced by convention. Further, some embodiments of the open platform interface adopt the semantic of "default values must result in acceptable behavior."

Communications between the external application server and the host are considered trusted because the host always initiates the transaction on behalf of the user in the host agnostic interface and interoperability system. Moreover, the requests are all actions that the host would allow the user to do. When the action is not something that the user should be able to do (i.e., get a protected file), the host agnostic interface and interoperability system should require proof keys. The host agnostic interface and interoperability system employs an optional proof system that allows the host to verify the identity of the requester and add an additional layer of trust to the transaction. The proof system uses requests (i.e., calls) that carry proof of the identity of the caller. To implement the proof system, the host must obtain a cryptographic key (i.e., the proof key) specific to the external application server. The proof key provides the host with a mechanism by which to verify that a request was, in fact, made by the trusted external application server. In various embodiments, the host obtains the cryptographic key overs a HTTPS connection to ensure that the host is communicating with the external application server with which the host expects to be communicating. In one embodiment relying on a public-key cryptographic system such as RSA, the proof key is a public key corresponding to a private key held by the external application server. The external application signs portions of subsequent communications using a private key corresponding to the public key to create a cryptographic signature. In the various embodiments, the portions that are signed include the timestamp, the URL, the access token, and a hash of one or more these pieces of information. More specifically, a timestamp is added to the header and included in the signature, and the URL to which the external application server is initiating the request is included in the signature. In various embodiments, the request from the external application server includes a proof header that carries the cryptographic signature. The host uses the proof key to confirm that the cryptographic signature was generated using the corresponding private key. In some embodiments, the host uses the timestamp to verify that the cryptographic signature is within acceptable temporal limits.

While many applications will benefit from the additional layer of trust offered by the proof system, the proof system is an optional component of the host agnostic interface and interoperability system. The host has the option of enforcing or requiring proof of identity. If the service application does not supply a proof header when required by the host, the host simply ignores the request or, alternatively, returns an error message indicating that the request is unauthorized. In some embodiments, the host advertises that a proof header is required to the external application server so the service application will know to include the proof header in all requests. When proof of identity is not required, the host may choose to ignore the proof header in the request.

In the host agnostic interface and interoperability system, the host initiates the relationship with the external application server and obtains the proof key from the external application server at that time. In various embodiments, the proof key is provided to the host as part of the discovery metadata returned during the discovery process or as part of an initial callback to the host. The host also expects future communications to come from the external application server. Because the external application server provided the proof key when the host initiated the trust relationship, the host can rely on the fact that a cryptographic signature validated using the proof key was generated by the same external application server that originally provided the proof key and not spoofed by a third party.

The open platform interface uses an access token to uniquely identify a transaction. Moreover, the access token provides an authentication mechanism for the communications related to that transaction and eliminates the need for the external application server (i.e., the open platform interface client) to participate in a particular authentication scheme generally used by the host. The access token is a token that is unique to the user/document pair that the host endpoint 120 uses to authenticate the user 106 and authorize access to the document. In various embodiments, the access token includes a hash of one or more of the user identifier, the time stamp, and the document identifier and is encrypted with a secret known to the host.

The use of host initiated transactions allows the host agnostic interface and interoperability system to rely on host side authentication and avoids the need for the external application server to natively authenticate the user. In other words, the user always does some action (e.g., a user interface action or gesture) on the host that indicates the user wants to start interacting with a document in a particular way (e.g., editing, mobile viewing, etc.). The host always has an opportunity to contemporaneously generate an access token that is optionally bound to the user and the document, has a relatively short lifespan, and can be subsequently validated by the host. The open platform interface does not require the host to use a particular scheme to generate the access token, and the host can use any of a variety of known access token generation schemes or a new one for this purpose. The service application does not need to know anything about the access token except that it exists and that is associated with a particular transaction (i.e., it identifies a particular user and file). The actual contents of the access token are entirely opaque to the service application. The service application simply includes the access token in communications with the host involving the associated transaction. Because the host does not have to make the access token intelligible to the external application server, the host is able to use any information to guarantee that the access token is tied to the particular user and file and that the access token is not valid indefinitely.

The conventions of the open platform interface strongly encourage the host to link the access token to a specific user and a specific resource (e.g., a specific file or document) as part of recommended security practices. When so linked, even if the access token were to be compromised, the attacker would only obtain access to the specific file and only have the rights granted to the specific user rather than general permission for everything that user could do in a given system. Because of the types and amount of information embedded in the URLs used by the open interface protocol (e.g., the access token or the document content), use of a secure channel (e.g., HTTPS) is recommended, although not required, on all inbound and outbound calls in the open platform interface.

The metadata URL refers to the file and the access token refers to a specific access time by a specific user to that file. For example, if two users were editing the same document at the same time, both users be given the same metadata URL, but each user would have different access tokens allowing the host and/or the service application to separately track the actions (i.e., transactions) of each user. However, the service application is not required to identify or distinguish between the two users. All that is required of the service application is to simply include the access token in the request so the host can identify the user and perform any necessary user level authentication of the request.

If the transaction requires the service application to learn about additional resources, the conventions of the open platform interface specify that the host should provide a new access token for each additional resource. In other words, anytime the external application makes a call under the open platform interface to learn about a different resource, the host provides the metadata URL and an access token for that resource, so the service application can interact with that resource on behalf of the user. If the service application needs to know anything else about the user (e.g., the user's name or what permissions the user has on a file), the host provides that information when the service application makes the first call to the host. The service application accepts the access token as identification and authorization to perform the transaction without having to independently and natively authenticate the user under whatever authentication scheme is used by the host. In other words, the access token allows the service application to completely trust the host to handle the user side of things.

Because the service application relies entirely on the access token and does not authenticate the user in any way, shape, or form, the open platform interface allows applications (e.g., the host application) to provide programmatic functionality to initiate requests for the service applications. The host directly issues a HTTP GET request to the service application wrapper against the appropriate service application entry URL using the open interface protocol, and the body of the response from the external application server to the host only contains data indicating the result of the task.

This functionality is made possible by the use of the access token, which eliminates the need for the user agent to navigate to the external application server directly to gain authentication information and is not available in the prior art requiring native authentication of the user.

For example, the host can request a document conversion without requiring interaction by the user. In such a case, the host sends a request directly to external application initiating the convert action and specifying the target file and the access token. In response, the service application calls the host endpoint, gets the files, performs the conversion, and returns the converted document to the host directly. In another example, the external application provides a teaser service that takes a document (e.g., a word processing or presentation document) and extracts selected bits of information (e.g., highlighted portions). The extracted information can then be shown in a news feed or other outlet. As the open platform interface allows the host to get that data directly without having the user having to be involved in the process at the time. Basically, the host just wakes up and asks external application server to provide a teaser for a document. The user is not required to be present when the host makes the request. Moreover, the service application starts the call directly (i.e., programmatically) rather than loading code into a webpage. As long as the call provides the required information (e.g., the file identifier and the access token), the external application performs the request and returns the requested data directly to the host rather than sending it to a browser instance.

In addition to the two core methods (i.e., getting metadata and getting binary data), various embodiments of the open platform interface define additional methods. The additional methods are defined by the open platform interface and the associated conventions. The external application server advertises the availability of the additional methods in the form of a list of functional sets. Each functional set is declared by string (e.g., Cobalt, Locking, Update), and promises the implementation a set of methods supported by the open platform interface. In turn, the host advertises which functional sets it supports. Accordingly, the external application server knows whether to provide certain functionality based on the capabilities of the host. More specifically, if the host does not advertise support for specific functionality, the service application suppresses any features that require the unsupported functionality. For example, the service application should not allow the user to edit a document when the host is not capable of saving an updated copy of the file.

The declaration, implementation, and consumption of functional sets serve as the primary extensibility mechanism of the open platform interface. The open platform interface does not allow a generic (i.e., fully open) metadata exchange mechanism, such as is used by the Simple Object Access Protocol (SOAP), to describe available functionality. In other words, the functional sets available for a host to implement are limited to those provided by the open platform interface and the associated conventions. By tying the available functional sets to conventions, the open protocol interface is freed of the burden of attempting to fully describe the functionality. Instead, each convention is simply declared, and only used if both sides believe they know what the convention means. The only time a convention blocks action is when the service application claims a convention is required and the host does not understand that requirement.

A functional set is made up from one or more verbs describing a method supported by the interface. Each verb defines the format and content of the requests and responses between the host and the external application server for a particular method of the interface. In general, the definition of each verb describes the format (i.e., the URL structure) of the request, the supported headers associated with the request, any information that is required or optionally included in the request body, the supported error codes, any supported headers providing additional information about the error codes, the supported headers associated with the response, and any information that is included in the response body. The following discussion describes one exemplary embodiment of the interface. This example is not intended to limit the features and functionality provided by the interface in any manner.

FIGS. 2A to 2E illustrate one embodiment of a process using the open interface protocol to access a document handled by the host 102 with the functionality provided by the service application 118. A specific example of a transaction using the process occurs where the user 106 wants to view a word processing document received as an attachment to an e-mail. This exemplary transaction should not be construed as limiting the host agnostic integration and interaction system 100 in any way. In this example, the host 102 has already discovered the external application server 104 and knows where to find the external application server 104, knows how to generate the service application entry URLs to invoke the service application, and possesses the public key provided by the external application server 104.

The user 106 accesses the host 102 via the user agent on the client computing device 110 and requests (step 202) content from the host 102. The host 102 recognizes (step 204) that the requested content includes a reference to a stored document. In the exemplary embodiment, the content is an e-mail message containing the attached word processing document. The host 102 consults (step 206) the discovery metadata to determine if the document type is supported. For documents of a type supported by the external application server 104, the host 102 determines (step 208) the actions associated with that document type that are supported by the external application server 104. The host 102 selectively generates (step 210) an action link for each action supported by the external application server 104 and associates the action link with the document. The host 102 then provides (step 212) the content and the associated action links. The user agent displays (step 214) the content, including the action links, provided by the host. Transmitting (step 216) the action link in the host-provided content indicates that the user 106 desires to perform the selected action on the associated document referenced in the host-provided content. In this scenario, the user 106 clicks the view link in the e-mail message for the attachment to view the document content.

As previously mentioned, the host 102 manages the user access rights for the document and licenses for each supported service application provided by the external application server. The host optionally considers user level permissions, external application server/service application licensing, administrative restrictions, and context-based restrictions at various points during the document access process before offering the functionality to the user or allowing the user to invoke the action. In various embodiments, the selectively considers whether or not access should be restricted due to insufficient user permissions/access rights for the desired access to the document, lack of a valid license to use the associated service application/external application server, administrative restrictions in the host configuration that prevent the host from retrieving or saving the selected document type, and/or the action being inappropriate in the context of the content being delivered (e.g., the host may restrict editing a document when attached to an incoming e-mail but otherwise allow the user to edit that document in other contexts). Other criteria may be used in other embodiments without departing from the scope and spirit of the present invention. In the illustrated embodiment, when the user 106 clicks on the action link, the host 102 verifies (step 218) that the user 106 has permission to access the document and/or has the necessary license to use the supporting service application/external application server 104. When the host 102 determines that the action is restricted, the host 102 does not invoke (step 220) a restricted action. If the action is not restricted, the host 102 contacts the external application server 104 to invoke the action.

Once an action has been invoked, the host opens (step 222) and the user agent displays (step 224) the service application wrapper that contains the service application user interface (i.e., the output) of the external application server 104. The host 102 generates the service application entry URL used to call the external application server 104 and invoke the selected action. The host 102 consults (step 226) the discovery metadata for the selected action and document type to obtain the parameters and the format of the service application entry URL. The base of service application entry URL is the address of the external application server appended with additional path information for the appropriate service application and any required or optional parameters. The parameters include, but are not limited to, a URL pointing to an address within the host endpoint, an identifier or locator for the resource that is the target of the selected action, and, optionally, the access token for the user 106 based on the authentication scheme used by the host. The host 102 already knows the identity of the user 106 based on the authentication scheme used by the host 102 and also knows the identity of the document because the host 102 is providing it. In various embodiments, the resource identifier is combined with a selected address within the host endpoint URL to create a metadata URL for the document.

Under the open platform interface, the metadata URL is used to manipulate the resource metadata or properties of the resource (e.g., locking the file or identifying the owner of the file). By convention, the metadata URL has a defined structure and the open platform interface derives the other URLs that are used by the open platform interface from the metadata URL. In the various embodiments, the URLs for additional actions are obtained by making substitutions in the metadata URL or appending paths to the metadata URL. In one embodiment, the metadata URL path has the form \\<host address>\wopi\<collection type>\<resource ID> where <host address> is the domain name of the host, <collection type> refers to the type of resource (e.g., files or folders), and <resource ID> identifies that target resource within that collection.

Next, the host 102 generates (step 228) the access token linking the user 106 and the document. The host combines (step 230) the parameters with the base URL of the external application server 104 to construct the service application entry URL. In some embodiments, the service application wrapper is responsible for generating the parameters and constructing the service application entry URL. The host 102 then directs the user agent 108 to navigate (step 232) to the service application 118 running at the service application entry URL. The external application server 104 parses (step 234) the service application entry URL and extracts the metadata URL and the access token. The external application server 104 also posts (step 236) the service application user interface, which contains the service application user interface and the document content, to the service application wrapper. The service application user interface is viewable (step 238) via the user agent on the client computing device 110.

Once an action against a document has been invoked by the host 102, the external application server 104 initiates all further communications with the host 102 (e.g., accessing a document stored on the host or performing other file system actions) through requests sent to the host endpoint 120. In the illustrated embodiment, obtaining the document from the host 102 occurs in multiple steps. The external application server 104 sends (step 240) a document metadata request that includes the access token and the file identifier, to the metadata URL of the host endpoint 120 in order to learn about the document (i.e., to get the document metadata/properties). In some embodiments, the document metadata request includes a proof header including the cryptographic signature, and the host examines (step 242) the cryptographic signature before returning the information about the document to the service application 118. The host 102 optionally validates the access token (step 244) before returning the document metadata. If the host 102 cannot verify the cryptographic signature using the proof key or validate the access token, the host denies (step 246) the document metadata request. Otherwise, the host returns (step 248) the document metadata that is relevant to the request to the external application server in the body of the response, which is consumed (step 250) by the external application server 104.

Next, the external application server sends (step 252) a second request, which also includes the access token and the file identifier to the file access URL to obtain the binary contents of the document. In various embodiments, the file access URL is a modified version of the metadata URL generated according to a formula or patent established by the conventions of the open platform interface and does not need to be provided in the document metadata. In one embodiment, the file access URL is generated by appending "\content" to the metadata URL (i.e., by adding a subpath/folder/directory). As with the document metadata request, some embodiments of the document content request include a proof header including the cryptographic signature, and the host optionally examines (step 254) the cryptographic signature before returning the document content to the service application 118. The host 102 also optionally validates the access token (step 256) before returning the binary content of the document. If the host 102 cannot verify the cryptographic signature using the proof key or validate the access token, the host ignores or denies (step 258) the document content request. Otherwise, the host returns (step 260) the document content in the body of the document content response, which is consumed (step 262) by the external application server 104. Alternatively, the file access URL provided in the document metadata is a direct access URL, which is a direct link to the document content. The use of a direct access URL is beneficial when a content storage system (i.e., the host) maintains the document metadata on one set of servers and the actual document content on a different set of servers. Using the direct access URL eliminates the need for the host to serve as a middle man to get the document content stored on a separate server. In several embodiments, a request to the direct access URL does not use the proof system and is not decorated with the normal open platform interface headers.

As the document content is received, the external application server 104 updates (step 264) the service application user interface to include the document content, which allows the user 106 to access the document. The service application wrapper 122 provided by the host 102 displays (step 266) the updated service application user interface. The user 106 interacts (step 268) with service application user interface via the user agent to manipulate the document. The external application server 104 processes (step 270) the interaction by the user

106 and manipulates the document content as required. The steps of updating (step 264), displaying (step 266), interacting with (step 268), and processing (step 270) the service application user interface repeat as necessary until the service application determines (step 272) that the user 106 is finished interacting with the document.

After all interaction with the document concludes, the external application server 104 requests (step 274) that the host 102 commit any changes made to the document and closes (step 276) the service application session. The host 102 responds by saving the document (step 278), if necessary, and closing the document (step 280).

As previously indicated, FIGS. 2A to 2E represent one embodiment of the process and should not be construed as limiting the process to any particular set or sequence of steps. Other embodiments of the process may include additional steps, omit steps, combine steps, and alter the order of the steps. Examples of alternate embodiments of the process are described below. In some embodiments, the host also checks restrictions prior to or at the time of generating an action link or a dynamic user interface controls (e.g., a context menu) used to access to the functionality provided by the external application server. If the action is restricted for that document type, the host does not generate/display the action link or the command in the dynamic user interface control. Such preliminary verification prevents the user 106 from being offered the opportunity to perform actions on the document only to be denied after selecting the action link. In another embodiment, the host 102 predetermines the format of the service application entry URLs at the time the host consults the discovery metadata to determine the actions on the document supported by the external application server 104, effectively combining step 206 and step 226.

As described herein, an open platform interface system allowing host agnostic integration between a host and an external application server using common protocols is provided. Under the open platform interface system, authentication, security, and file system operations are solely the responsibility of the host. The external application server does not include the complexity and overhead associated with network access, user authentication, file storage, network and file security, and other administrative tasks normally handled by other servers within a network and often specific to a particular enterprise. Omitting such features and focusing the external application server on handling document actions through the open interface protocol allows the external application server to be used in a wide range of enterprise network scenarios. It should be appreciated that an external application server performing as described herein and assuming additional roles and responsibilities normally handled by other servers on the enterprise network falls within the scope and spirit of the present invention.

Figure 3:
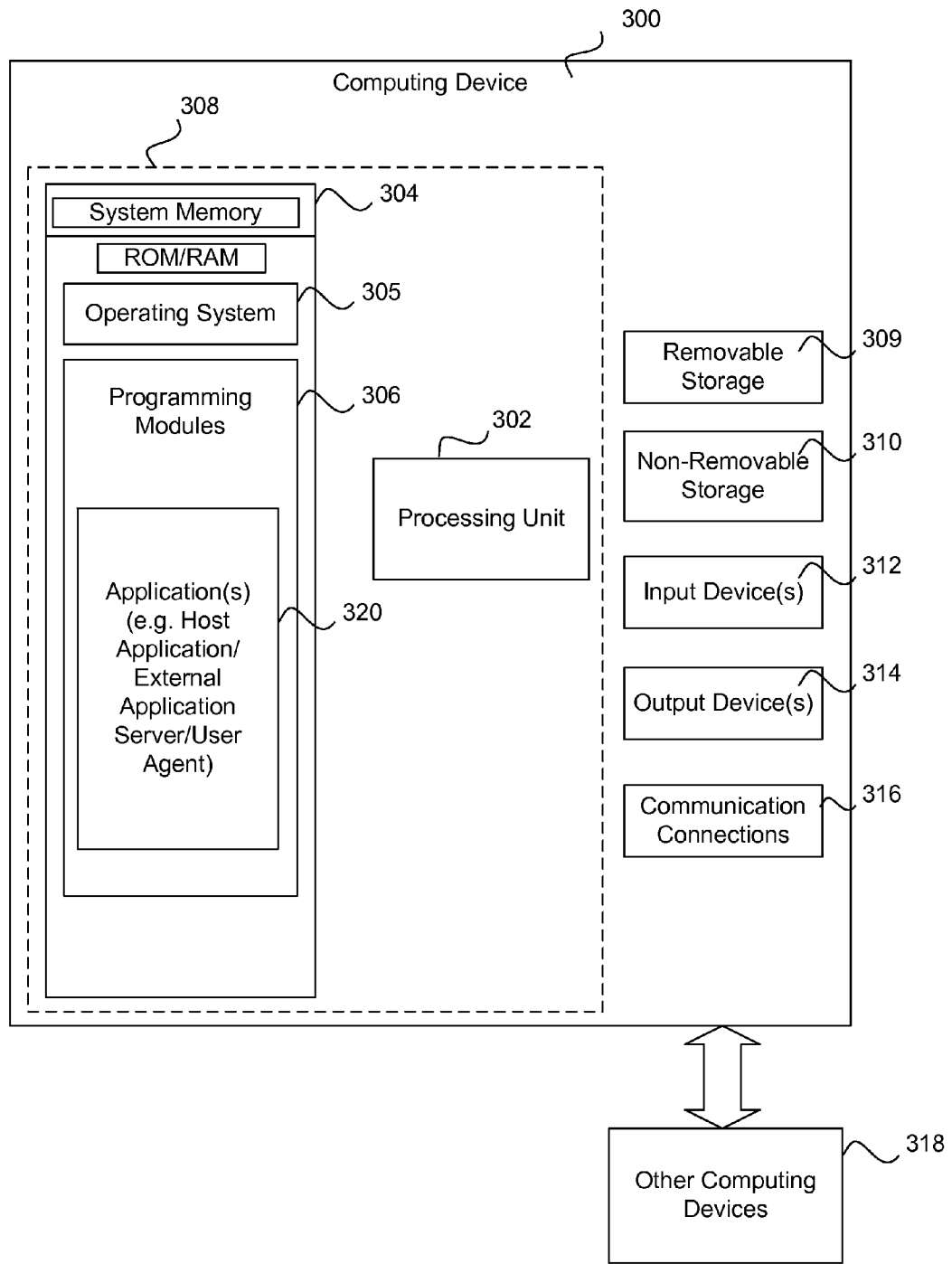
FIG. 3 is a simplified block diagram of a computing device with which embodiments of the present invention may be practiced.

The embodiments and functionalities described herein may operate via a multitude of computing systems such as the host 102, and the external application server 104, and the client computing device 110 described above with reference to FIG. 1, including wired and wireless computing systems, mobile computing systems (e.g., mobile telephones, tablet or slate type computers, laptop computers, etc.). In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 3 through 5 and the associated descriptions provide a discussion of a variety of operating environments in which embodiments of the invention may be practiced. However, the devices and systems illustrated and discussed with respect to FIGS. 3 through 5 are for purposes of example and illustration and are not limiting of a vast number of computing device configurations that may be utilized for practicing embodiments of the invention, described herein.

FIG. 3 is a block diagram illustrating example physical components of a computing device 300 with which embodiments of the invention may be practiced. The computing device components described below may be suitable for the computing devices described above, for example, the host 102, the external application server 104, and the client computing device 110. In a basic configuration, the computing device 300 may include at least one processing unit 302 and a system memory 304. Depending on the configuration and type of computing device, the system memory 304 may comprise, but is not limited to, volatile storage (e.g. random access memory (RAM)), non-volatile storage (e.g. read-only memory (ROM)), flash memory, or any combination. The system memory 304 may include an operating system 305, one or more programming modules 306, which are suitable for running applications 320 such as client applications (e.g., the user agent/web browser 108) or server applications (e.g., the host application 112 or the service applications 118). The operating system 305, for example, may be suitable for controlling the operation of the computing device 300. Furthermore, embodiments of the invention may be practiced in conjunction with a graphics library, other operating systems, or any other application program and is not limited to any particular application or system. This basic configuration is illustrated in FIG. 3 by those components within a dashed line 308. The computing device 300 may have additional features or functionality. For example, the computing device 300 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 304. While executing on the processing unit 302, the programming modules 306, such as the user agent 108, the host application 112, or the service application 118 may perform processes including, for example, one or more of the stages of the method shown in FIGS. 2A through 2E. The aforementioned process is an example, and the processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the user agent 108, the host application 112, or the service application 118 may be operated via application-specific logic integrated with other components of the computing device 300 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 304, the removable storage device 309, and the non-removable storage device 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 300. Any such computer storage media may be part of the computing device 300. The computing device 300 may also have one or more input device(s) 312 such as a keyboard, a mouse, a pen, a sound input device, a touch input device, etc. The output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The computing device 300 may include one or more communication connections 316 allowing communications with other computing devices 318. Examples of suitable communication connections 316 include, but are not limited to, RF transmitter, receiver, and/or transceiver circuitry; universal serial bus (USB), parallel, or serial ports, and other connections appropriate for use with the applicable computer readable media.

Figure 4A:
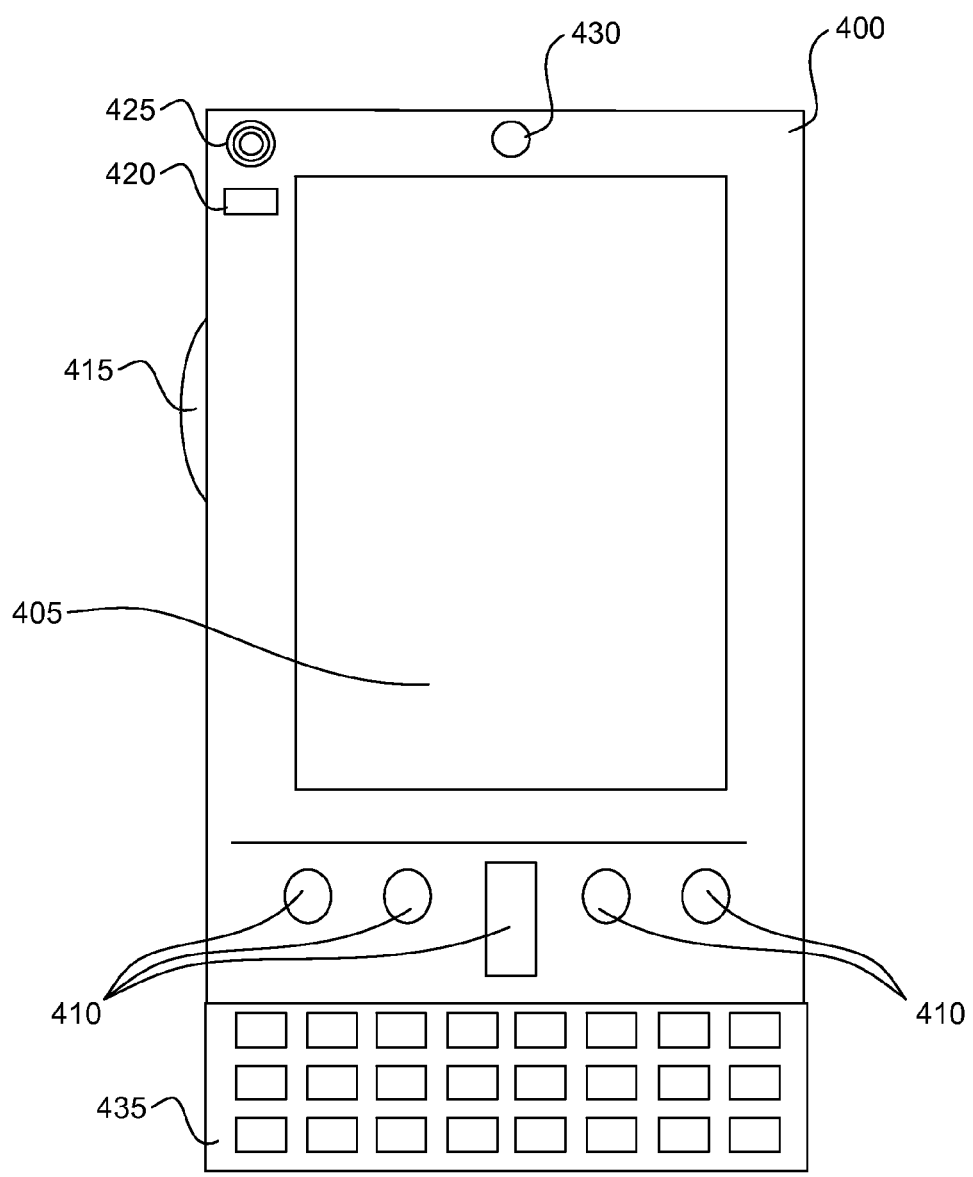
FIGS. 4A and 4B are simplified block diagrams of a mobile computing device with which embodiments of the present invention may be practiced.
Figure 4B:
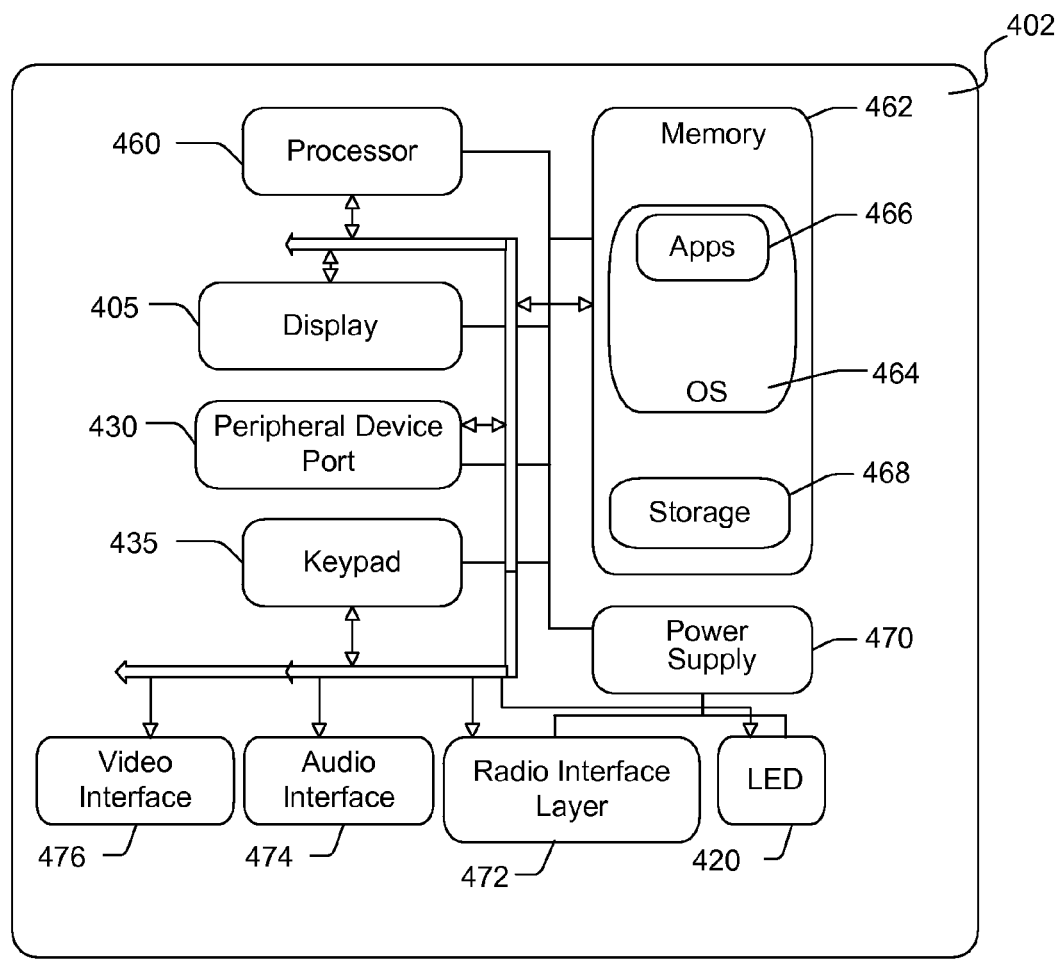
Figure 5:
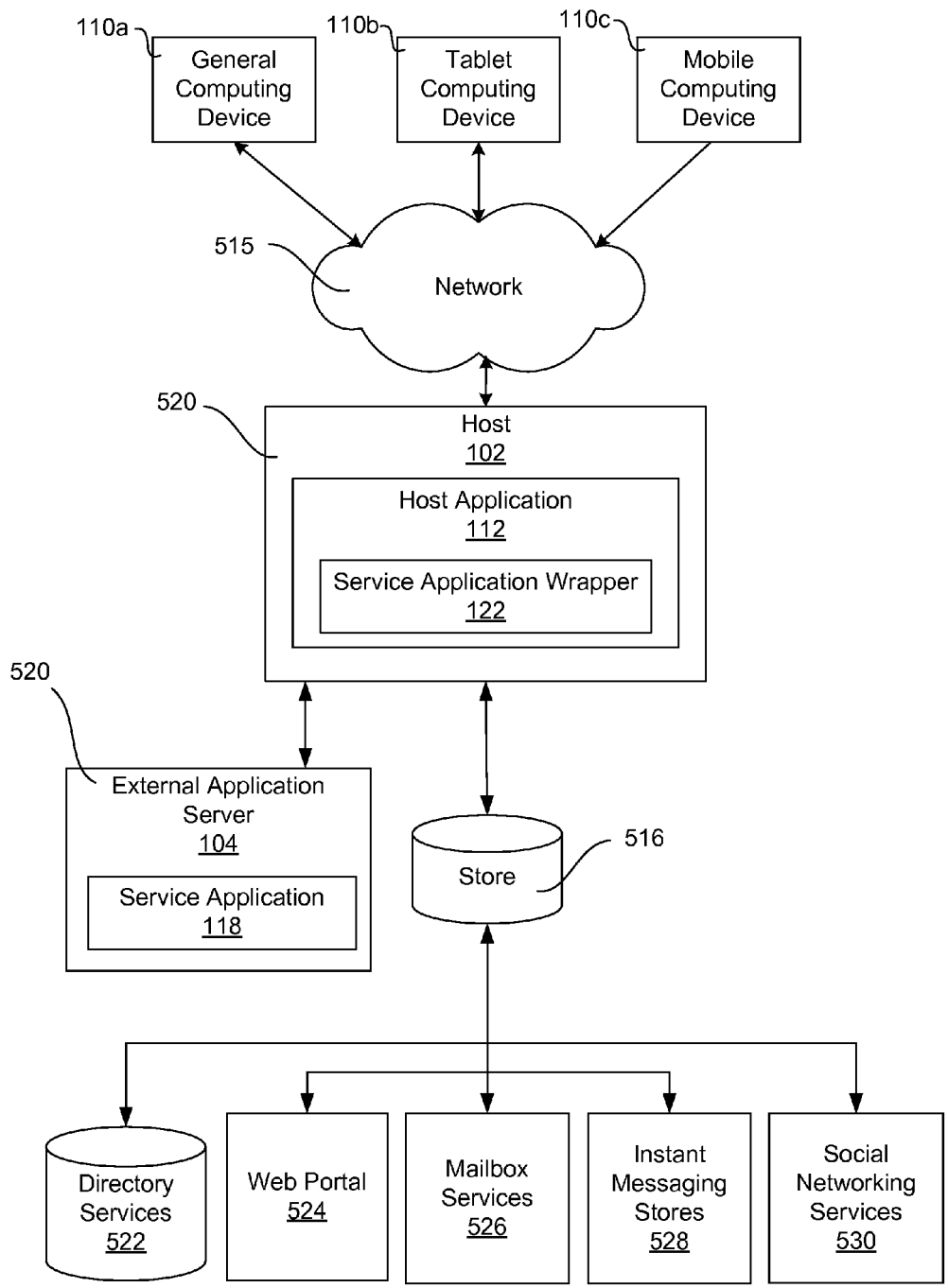
FIG. 5 is a simplified block diagram of a distributed computing system in which embodiments of the present invention may be practiced.

FIGS. 4A and 4B illustrate a mobile computing device 400, for example, a mobile telephone, a smart phone, a tablet personal computer, a laptop computer, and the like, with which embodiments of the invention may be practiced. With reference to FIG. 4A, an exemplary mobile computing device 400 for implementing the embodiments is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., a touch screen display). If included, an optional side input element 415 allows further user input. The side input element 415 may be a rotary switch, a button, or any other type of manual input element. In alternative embodiments, mobile computing device 400 may incorporate more or less input elements. For example, the display 405 may not be a touch screen in some embodiments. In yet another alternative embodiment, the mobile computing device 400 is a portable phone system, such as a cellular phone. The mobile computing device 400 may also include an optional keypad 435. Optional keypad 435 may be a physical keypad or a "soft" keypad generated on the touch screen display. In various embodiments, the output elements include the display 405 for showing a graphical user interface (GUI), a visual indicator 420 (e.g., a light emitting diode), and/or an audio transducer 425 (e.g., a speaker). In some embodiments, the mobile computing device 400 incorporates a vibration transducer for providing the user with tactile feedback. In yet another embodiment, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

Although described herein in combination with the mobile computing device 400, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 4B is a block diagram illustrating the architecture of one embodiment of a mobile computing device. That is, the mobile computing device 400 can incorporate a system (i.e., an architecture) 402 to implement some embodiments. In one embodiment, the system 402 is implemented as a "smart phone" capable of running one or more applications (e.g., browser, e-mail, calendaring, contact managers, messaging clients, games, and media clients/players). In some embodiments, the system 402 is integrated as a computing device, such as an integrated personal digital assistant (PDA) and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device 400, including the user agent 108, the host application 112, or the service application 118, described herein.

The system 402 has a power supply 470, which may be implemented as one or more batteries. The power supply 470 might further include an external power source, such as an AC adapter or a powered docking cradle that supplements or recharges the batteries.

The system 402 may also include a radio 472 that performs the function of transmitting and receiving radio frequency communications. The radio 472 facilitates wireless connectivity between the system 402 and the "outside world", via a communications carrier or service provider. Transmissions to and from the radio 472 are conducted under control of the operating system 464. In other words, communications received by the radio 472 may be disseminated to the application programs 466 via the operating system 464, and vice versa.

The radio 472 allows the system 402 to communicate with other computing devices, such as over a network. The radio 472 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 402 provides notifications using the visual indicator 420 that can be used to provide visual notifications and/or an audio interface 474 producing audible notifications via the audio transducer 425. In the illustrated embodiment, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425, the audio interface 474 may also be coupled to a microphone to receive audible input, such as to facilitate a telephone conversation. In accordance with embodiments of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468. Computer storage media may include volatile and nonvolatile, removable and non-removable media implemented in any method or technology for storage of information, such as computer readable instructions, data structures, program modules, or other data.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one embodiment of the architecture of a system for providing the user agent 108, the host application 112, and/or the service application 118 to one or more client devices, as described above. Content developed, interacted with or edited in association with the host application 112, and/or the service application 118 may be stored in different communication channels or other storage types. For example, various documents may be stored using a directory service 522, a web portal 524, a mailbox service 526, an instant messaging store 528, or a social networking site 530. The host application 112 and/or the service application 118 may use any of these types of systems or the like for enabling data utilization, as described herein. A server 520 may provide the host application 112 and/or the service application 118 to clients. As one example, the server 520 may be a web server providing the host application 112, and/or the service application 118 over the web. The server 520 may provide the host application 112 and/or the service application 118 over the web to clients through a network 515. By way of example, the client computing device 110 may be implemented as the computing device 300 and embodied in a personal computer 110a, a tablet computing device 110b and/or a mobile computing device 110c (e.g., a smart phone). Any of these embodiments of the client computing device 110 may obtain content from the store 516.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the invention.

In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

What is claimed is:

1. A method for securely communicating between a host and a service application running on a selected external application server to allow a service application running on the external application server to access a document maintained by the host, said method comprising the steps of:
    initiating a transaction, by the host, with the selected external application server by transmitting an action request from the host to the service application running on the selected external application server, the action request being against an entry point address associated with the service application;
    initiating a communication with the selected external application server to obtain a proof key adapted to validate a proof signature;
    receiving said proof key in response to said communication;
    providing the selected external application server with an access token and a document identifier for use in fulfilling said action request;
    receiving a metadata request comprising said access token and said document identifier;
    validating said access token prior to responding to said metadata request;
    sending a metadata response comprising selected metadata based on said action request when said access token is valid;
    receiving a content request comprising said access token and said document identifier;
    validating said access token prior to responding to said content request; and
    sending a content response comprising content from the document identified by said document identifier when said access token is valid.

2. The method of claim 1 further comprising the step of generating said access token prior to said step of providing the selected external application server with said access token and said document identifier.

3. The method of claim 1 characterized in that at least one of said access token and said document identifier are provided in said action request.

4. The method of claim 3 characterized in that the document is protected, said method further comprising the steps of:
    notifying the external application server that said content request must be a secure request in response to said step of receiving a metadata request;
    receiving a proof signature in said content request; and
    validating said proof signature using said proof key prior to responding to said content request.

5. The method of claim 1, wherein the proof key is generated by the selected external application server, said proof signature uniquely identifying the selected external application server.

6. The method of claim 5 characterized in that said metadata request and said content request each further comprises a proof signature adapted to be validated using said proof key.

7. The method of claim 5 further comprising the step of:
    verifying that said metadata request was sent from the selected external application server prior to responding to said metadata request; and
    verifying that said content request was sent from the selected external application server prior to responding to said content request.

8. The method of claim 1 characterized in that said step of initiating a transaction with a selected external application server occurs in response to the step of navigating a user agent to an endpoint address on said host in response to an instruction from a user via a user agent.

9. The method of claim 1 characterized in that said step of initiating a transaction with a selected external application server occurs in response to the step of programmatically instructing the host to initiate the transaction without navigating a user agent to an endpoint address on said host.

10. A computer storage device containing computer executable instructions which when executed by a computer perform a method for communicating between a host and a service application running on a selected external application server to allow a service application running on the external application server to access a document maintained by the host, said method comprising the steps of:

providing a host with a proof key uniquely identifying an external application server in response to a discovery request from the host;

receiving at the service application running on the external application server an action, an access token, a metadata address, and a document identifier transmitted by the host to the service application running on the external application server;

invoking said service application on said external application server in response to receipt of said action;

sending a metadata request comprising a proof signature generated using said proof key, said access token, and said document identifier to said metadata address;

receiving a metadata response comprising information related to a document identified by said document identifier, said information selected based on said action;

sending a document content request comprising said proof signature, said access token, and said document identifier to a document access address; and receiving a content response comprising the content of the document.

11. The computer storage device of claim 10 characterized in that said method further comprises the step of initiating a method call to the host in response to an action request initiated by a user via a user agent, said method call providing said access token and said document identifier to the host.

12. The computer storage device of claim 10 characterized in that said method further comprises the step of initiating a method call to the host programmatically without navigating a user agent to an endpoint address on said host, said method call providing said access token and said document identifier to the host.

13. A method for securely communicating between a host and a service application running on an external application server to allow a service application running on the external application server to access a document maintained by the host, said method comprising the steps of:

initiating a communication with a selected external application server to obtain a proof key uniquely identifying a selected external application server, said proof key adapted for validating a proof signature generated by the selected external application server;

receiving said proof key from the selected external application server;

initiating, by the host, a transaction between the host and the external application server by transmitting an action request from the host to the service application running on the selected external application server, the action request being against an entry point associated with the service application;

providing, by the host, the selected external application server with an access token and a document identifier for use in fulfilling said action request;

generating said access token prior to said step of providing the selected external application server with said access token and a document identifier;

receiving a metadata request comprising a proof signature, said access token, and said document identifier, said proof signature designed to be validated using said proof key;

validating said proof signature using said proof key prior to responding to said metadata request;

validating said access token prior to responding to said metadata request;

sending a metadata response comprising selected metadata based on said action request when said proof signature and said access are valid;

receiving a content request comprising said proof signature, said access token, and said document identifier;

validating said proof signature prior to responding to said content request;

validating said access token prior to responding to said content request; and sending a content response comprising content from the document identified by said document identifier when said proof signature and said access token are valid.

14. The method of claim 13 further comprising the step of consuming declarations for a set of method calls, each method call declared using a convention of an interface, said set of method calls comprising a method call for getting metadata about the document and a method call for getting the content of the document.

15. The method of claim 14 characterized in that said set of method calls further comprises one or more method calls selected from the group consisting of method calls for getting metadata about a folder, saving the document, saving a copy of the document, enumerating the contents of a folder, deleting a file, locking a file, unlocking a file, renewing a lock on a file, unlocking and relocking a file, executing a local virtual application, and executing a remote virtual application.

16. The method of claim 14 characterized in that said set of method calls is extendible by declaring an additional method call based on a selected convention of said interface understood by the external application server, said additional method call used only said selected convention is understood by both the host and the external application server.

17. The method of claim 14 characterized in that a selected method call is extendible by declaring an additional metadata passed as part of said selected method call, said selected method call utilizing said additional metadata only when both the host and the external application server understand said additional metadata.

18. The method of claim 14 characterized in that said metadata response to said method call for getting metadata about the document comprises metadata selected from the group consisting of a file version identifier, a base filename, an owner identifier, a file size value, and a file hash code.

19. The method of claim 18 characterized in that said metadata response to said method call for getting metadata about the document further comprises metadata selected from the group consisting of a client URL used to access the document provided by the host, a download URL used to trigger the native download function of a user agent, a close URL used when the document is closed, a host view URL used to access a view page provided by the host, a host edit URL used for access to an edit page provided by the host, a user write permission flag, a read only flag, a public flag, a hide formulas flag, an update support flag, a lock support flag indicating, a virtual application support flag, a container support flag, a file URL for directly accessing a document, a privacy URL, and a terms of use URL.

20. The method of claim 14 characterized in that said content response to said method call for getting metadata about the document comprises a response body comprising the binary content of the document.

* * * * *